United States Patent
Jaffer et al.

(10) Patent No.: US 10,833,980 B2
(45) Date of Patent: Nov. 10, 2020

(54) ROUTER DEVICE USING FLOW DUPLICATION

(71) Applicant: 128 Technology, Inc., Burlington, MA (US)

(72) Inventors: Sarah V. Jaffer, Billerica, MA (US); Michael Baj, Somerville, MA (US); Patrick Timmons, Newton, MA (US); Patrick J. McLampy, Dunstable, MA (US)

(73) Assignee: 128 Technology, Inc., Burlington, MA (US)

( * ) Notice: Subject to any disclaimer, the term of this patent is extended or adjusted under 35 U.S.C. 154(b) by 0 days.

(21) Appl. No.: 15/913,656

(22) Filed: Mar. 6, 2018

(65) Prior Publication Data

US 2018/0262420 A1 Sep. 13, 2018

Related U.S. Application Data

(60) Provisional application No. 62/468,299, filed on Mar. 7, 2017.

(51) Int. Cl.
*H04L 12/707* (2013.01)
*H04L 12/801* (2013.01)

(52) U.S. Cl.
CPC .............. *H04L 45/24* (2013.01); *H04L 47/34* (2013.01)

(58) Field of Classification Search
CPC ..... H04L 43/10; H04L 43/0858; H04L 45/24; H04L 45/121; H04L 47/34
See application file for complete search history.

(56) References Cited

U.S. PATENT DOCUMENTS

| 6,515,963 B1 | 2/2003 | Bechtolsheim et al. |
| 6,563,824 B1 | 5/2003 | Bhatia et al. |

(Continued)

FOREIGN PATENT DOCUMENTS

| CN | 101552703 A | 10/2009 |
| CN | 101646220 A | 2/2010 |

(Continued)

OTHER PUBLICATIONS

Berners-Lee et al., *Uniform Resource Identifier (URI): Generic Syntax*, Network Working Group, Request for Comments 3986, The Internet Society, 61 pages, Jan. 2005.

(Continued)

*Primary Examiner* — Kevin C. Harper
(74) *Attorney, Agent, or Firm* — Nutter McClennen & Fish LLP

(57) ABSTRACT

A method and apparatus for routing a plurality of session packets across a network toward a destination modifies each packet to include a sequence number that is different from the sequence number of other packets in the plurality of packets. Accordingly, at this point, each of the plurality of packets is transformed into a corresponding plurality of processed packets. The method also duplicates the plurality of processed packets to produce a corresponding plurality of duplicated packets. Next, the method forwards the plurality of processed packets toward the destination using a first stateful path through the network, and correspondingly forwards the plurality of duplicated packets toward the destination using a second stateful path through the network. In preferred embodiments, the first stateful path is different from the second stateful path. For example, the two paths may be entirely distinct in that they share no common intermediary elements.

32 Claims, 15 Drawing Sheets

(56) References Cited

U.S. PATENT DOCUMENTS

| | | |
|---|---|---|
| 6,584,071 B1 | 6/2003 | Kodialam et al. |
| 6,721,334 B1 | 4/2004 | Ketcham |
| 6,738,387 B1 | 5/2004 | Lin et al. |
| 6,751,746 B1 | 6/2004 | Jain et al. |
| 6,778,531 B1 | 8/2004 | Kodialam et al. |
| 6,798,743 B1 | 9/2004 | Ma et al. |
| 7,020,087 B2 | 3/2006 | Steinberg et al. |
| 7,020,143 B2 | 3/2006 | Zdan |
| 7,035,214 B1 | 4/2006 | Seddigh et al. |
| 7,068,600 B2 | 6/2006 | Cain |
| 7,106,739 B2 | 9/2006 | Beier |
| 7,120,118 B2 | 10/2006 | Rajagopal et al. |
| 7,154,902 B1 | 12/2006 | Sikdar |
| 7,218,632 B1 | 5/2007 | Bechtolsheim et al. |
| 7,315,541 B1 | 1/2008 | Housel et al. |
| 7,373,660 B1 | 5/2008 | Guichard et al. |
| 7,466,703 B1 | 12/2008 | Arunachalam et al. |
| 7,536,720 B2 | 5/2009 | Burdett et al. |
| 7,634,805 B2 | 12/2009 | Aroya |
| 7,706,411 B2 | 4/2010 | Wakumoto et al. |
| 7,730,301 B2 | 6/2010 | Correll et al. |
| 7,773,611 B2 | 8/2010 | Booth, III et al. |
| 7,818,450 B2 | 10/2010 | Chen et al. |
| 7,872,973 B2 | 1/2011 | Sterne et al. |
| 8,068,417 B1 | 11/2011 | Roberts |
| 8,094,560 B2 | 1/2012 | Bagepalli et al. |
| 8,139,479 B1 | 3/2012 | Raszuk |
| 8,144,711 B1* | 3/2012 | Pegrum ............... H04L 12/4641 370/218 |
| RE44,119 E | 4/2013 | Wang et al. |
| 8,437,248 B2 | 5/2013 | Li et al. |
| 8,527,641 B2 | 9/2013 | Degaonkar et al. |
| 8,570,893 B2 | 10/2013 | Guo et al. |
| 8,584,199 B1 | 11/2013 | Chen et al. |
| 8,619,775 B2 | 12/2013 | Amir et al. |
| 8,634,428 B2 | 1/2014 | Le Pennec et al. |
| 8,660,126 B2 | 2/2014 | Crambert et al. |
| 8,804,489 B2 | 8/2014 | Lu et al. |
| 8,942,085 B1 | 1/2015 | Pani et al. |
| 8,989,020 B2 | 3/2015 | So |
| 9,059,920 B2 | 6/2015 | Ravindran et al. |
| 9,160,652 B2 | 10/2015 | Taillon et al. |
| 9,185,186 B2 | 11/2015 | Hong et al. |
| 9,240,953 B2 | 1/2016 | Carlstrom |
| 9,276,864 B1 | 3/2016 | Vincent |
| 9,614,756 B2 | 4/2017 | Joshi |
| 9,699,069 B1 | 7/2017 | Kielhofner et al. |
| 9,729,439 B2 | 8/2017 | MeLampy et al. |
| 9,871,720 B1* | 1/2018 | Tillotson ............... H04L 45/24 |
| 9,871,748 B2 | 1/2018 | Gosselin et al. |
| 2001/0030649 A1 | 10/2001 | Mamiya et al. |
| 2002/0021689 A1 | 2/2002 | Robbins et al. |
| 2002/0044553 A1* | 4/2002 | Chakravorty ........... H04L 47/10 370/392 |
| 2002/0075883 A1 | 6/2002 | Dell et al. |
| 2002/0107980 A1* | 8/2002 | Kawaguchi ............. H04L 45/24 709/238 |
| 2002/0109879 A1* | 8/2002 | Wing So .................. H04J 7/00 398/58 |
| 2002/0131403 A1* | 9/2002 | Desai ................. H04L 12/2801 370/352 |
| 2002/0176363 A1 | 11/2002 | Durinovic-Johri et al. |
| 2003/0198189 A1 | 10/2003 | Roberts et al. |
| 2003/0214938 A1 | 11/2003 | Jindal et al. |
| 2004/0008716 A1* | 1/2004 | Stiliadis ............... H04L 12/1881 370/429 |
| 2004/0088542 A1 | 5/2004 | Daude et al. |
| 2004/0199662 A1 | 10/2004 | Karol et al. |
| 2004/0264481 A1 | 12/2004 | Darling et al. |
| 2005/0013300 A1 | 1/2005 | Akahane et al. |
| 2005/0036616 A1 | 2/2005 | Huang et al. |
| 2005/0063307 A1 | 3/2005 | Samuels et al. |
| 2005/0182932 A1 | 8/2005 | Wheeler |
| 2005/0238022 A1 | 10/2005 | Panigrahy |
| 2005/0249206 A1 | 11/2005 | Wybenga et al. |
| 2006/0176894 A1 | 8/2006 | Oh et al. |
| 2006/0256768 A1 | 11/2006 | Chan |
| 2007/0171825 A1 | 7/2007 | Roberts et al. |
| 2007/0171826 A1 | 7/2007 | Roberts et al. |
| 2008/0013550 A1* | 1/2008 | Yamauchi ............... H04L 47/34 370/400 |
| 2008/0214175 A1 | 9/2008 | Papadoglou et al. |
| 2008/0259938 A1 | 10/2008 | Keene et al. |
| 2009/0007021 A1 | 1/2009 | Hayton |
| 2009/0059958 A1 | 3/2009 | Nakata |
| 2009/0086651 A1 | 4/2009 | Luft et al. |
| 2010/0125898 A1 | 5/2010 | Dubuc et al. |
| 2010/0191968 A1 | 7/2010 | Patil et al. |
| 2012/0144061 A1 | 6/2012 | Song |
| 2012/0236860 A1 | 9/2012 | Kompella et al. |
| 2013/0227166 A1 | 8/2013 | Ravindran et al. |
| 2013/0297824 A1 | 11/2013 | Lan et al. |
| 2014/0040488 A1 | 2/2014 | Small et al. |
| 2014/0198668 A1* | 7/2014 | Christenson ........... H04L 43/10 370/250 |
| 2015/0016286 A1* | 1/2015 | Ganichev ............ H04L 12/4633 370/252 |
| 2015/0188814 A1 | 7/2015 | Jain et al. |
| 2015/0229618 A1 | 8/2015 | Wan et al. |
| 2015/0319089 A1* | 11/2015 | Liu ....................... H04L 45/745 370/392 |
| 2015/0381324 A1 | 12/2015 | Mirsky et al. |
| 2016/0094444 A1 | 3/2016 | MeLampy et al. |
| 2016/0164780 A1 | 6/2016 | Timmons et al. |
| 2017/0195260 A1* | 7/2017 | Ma ....................... H04L 49/552 |

FOREIGN PATENT DOCUMENTS

| | | |
|---|---|---|
| CN | 101068242 B | 4/2010 |
| CN | 102158371 A | 8/2011 |
| CN | 101640629 B | 8/2012 |
| CN | 101640629 B | 9/2012 |
| CN | 102739507 A | 10/2012 |
| CN | 101207604 B | 3/2013 |
| CN | 102769679 B | 6/2015 |
| CN | 103179192 B | 11/2015 |
| CN | 105245469 A | 1/2016 |
| CN | 103188260 B | 3/2017 |
| EP | 0 963 082 A2 | 12/1999 |
| EP | 1 569 375 A1 | 8/2005 |
| EP | 1 313 267 B1 | 12/2006 |
| KR | 10-2011-0062994 A | 6/2011 |
| WO | WO 03/058868 A2 | 7/2003 |
| WO | WO 2007/084707 A2 | 7/2007 |
| WO | WO 2007/084755 A2 | 7/2007 |
| WO | WO 2008/043230 A1 | 4/2008 |
| WO | WO 2015/131537 A1 | 9/2015 |
| WO | WO 2016/007052 A1 | 1/2016 |

OTHER PUBLICATIONS

Bjorklund, *YANG—A Data Modeling Language for the Network Configuration Protocol (NETCONF)*, Internet Engineering Task Force (IETF), Request for Comments 6020, ISSN: 2070-1721, 173 pages, Oct. 2010.

Caida, *Observing routing asymmetry in Internet traffic*, (www.caida.org/research/traffic-analysis/asymmetry/1), 7 pages, dated Jul. 17, 2013.

Chiosi et al., *Network Functions Virtualisation—Introductory White Paper*, Issue 1, at the "SDN and OpenFlow World Congress", Darmstadt-Germany, (http://portal.etsi.org/nfv/nfv_white_paper), 16 pages, dated Oct. 22, 2012.

Cisco Systems, *Parallel Express Forwarding on the Cisco 10000 Series*, (White Paper) Cisco Systems, printed Jun. 17, 2015, 4 pages.

Data Plane Development Kit, *Programmer's Guide, Release 16.04.0*, 216 pages, Apr. 12, 2016.

Davis, *Layer 3 Switches Explained*, Happy Router, 6 pages, dated Aug. 30, 2007.

Filsfils et al., *Segment Routing Architecture*, Network Working Group, Draft, 28 pages, Oct. 21, 2013.

(56) References Cited

OTHER PUBLICATIONS

Hansson et al., *A Unified Approach to Constrained Mapping and Routing on Network-on-Chip Architectures*, CODES+ISSS '05 Proceedings of the 3rd IEEE/ACM/IFIP International Conference on Hardware/Software Codesign and System Synthesis, 6 pages, Sep. 19-21, 2005.
Herbert *xps: Transmit Packet Steering*, Eklektix, Inc., 11 pages, Oct. 26, 2010.
Iana, *Transmission Control Protocol (TCP) Parameters*, (www.iana.org/assignments/tcp-parameters/tcp-parameters.xhtm), 5 pages, dated Sep. 22, 2014.
Iyer, *Load Balancing and Parallelism for the Internet*, A Dissertation submitted to the Dept. of Computer Science and the Committee on Graduate Studies of Stanford University in Partial Fulfillment of the Requirements for the Degree of Doctor of Philosophy, retrieved on the internet at http://yuba.stanford.edu/~sundaes/Dissertation/sundar_thesis.pdf, 436 pages, Jul. 2008.
Katz et al., *Bidirectional Forwarding Detection (BFD)*, Internet Engineering Task Force (IETF), Request for Comments 5880, ISSN: 2070-1721, Juniper Networks, 49 pages, Jun. 2010.
Klement, *1.2 Overview of a TCP communications session*, RPG IV Socket Tutorial (http://www.scottklement.com/rpg/socketut/overview), 2 pages, 2001.
Microsoft, *Introduction to Receive Side Scaling*, Developer Resources, https://msdn.microsoft.com/en-us/library/windows/hardware/ff556942(v=vs.85).aspx, 3 pages, Apr. 2014.
Microsoft, *RSS with a Single Hardware Receive Queue*, Developer Resources, https://msdn.microsoft.com/en-us/library/windows/hardware/ff570727(v=vs.85).aspx, 2 pages, Jan. 2015.
Microsoft, *RSS with Hardware Queuing*, Developer Resources, https://msdn.microsoft.com/en-us/library/windows/hardware/ff570728(v=vs.85).aspx, 2 pages, Jan. 2015.
Microsoft, *Non-RSS Receive Processing*, Developer Resources, https://msdn.microsoft.com/en-us/library/windows/hardware/ff568798(v=vs.85).aspx, 2 pages, Jan. 2015.
PC Magazine Encyclopedia, *Definition of TCP/IP abc's*, PC Magazine Encyclopedia (www.pcmag.com/encyclopedia/term/52615), 5 pages, 2005.
Previdi, et al., *IPv6 Segment Routing Header (SRH)*, Network working Group, Draft, 24 pages, Jul. 3, 2014.
Roberts, *The Next Generation of IP—Flow Routing*, SSGRR 2003S International Conference, L'Aquila Italy, 11 pages, Jul. 29, 2003.
Rouse, *What is routing table?*, Posted by Margaret Rouse (http://searchnetworking.techtarget.com/definition/routing-table), 5 pages, Apr. 2007.
Shang et al., *Making Better Use of All Those TCP ACK Packets*, Computer Science Department, Worcester Polytechnic Institute, 10 pages, 2005.
Shaw, *Multi-queue network interfaces with SMP on Linux*, Greenhost, https://greenhost.net/2013/04/10/multi-queue-network-interfaces-with-smp-on-linux/, 5 pages, Apr. 10, 2013.
Sollins et al., *Functional Requirements for Uniform Resource Names*, Network Working Group, Request for Comments 1737, 7 pages, Dec. 1994.
Srinivasan et al., *A Technique for Low Energy Mapping and Routing in Network-on-Chip Architectures*, ISLPED '05 Proceedings of the 2005 International Symposium on Low Power Electronics and Design, 6 pages, Aug. 8-10, 2005.
Wikipedia, *LAN switching*, 5 pages, dated Jun. 12, 2013.
Wikipedia, *Management information base*, 6 pages, dated Jul. 15, 2013.
Wikipedia, *Reverse path forwarding*, 3 pages, dated Jul. 31, 2013.
Wikipedia, *Equal-cost multi path routing*, 1 page, dated Sep. 12, 2013.
Wikipedia, *Transmission Control Protocol*, 18 pages, dated Sep. 16, 2013.
Wikipedia, *Software-defined networking*, 6 pages, dated Sep. 16, 2013.
Wikipedia, *Network socket*, 4 pages, dated Sep. 19, 2013.
Wikipedia, *Router (computing)*, 8 pages, dated Sep. 23, 2013.
Wikipedia, *Network address translation*, 11 pages, dated Sep. 24, 2013.
Wikipedia, *Open vSwitch*, 2 pages, dated Nov. 24, 2013.
Wikipedia, *Active queue management*, https://en.wikipedia.org/wiki/Active_queue_management, 2 pages, Apr. 22, 2015.
Wikipedia, *Network interface controller*, https://en.wikipedia.org/wiki/Network_interface_controller.5 pages, May 19, 2015.
International Searching Authority, International Search Report—International Application No. PCT/2015/044815, dated Dec. 6, 2015, together with the Written Opinion of the International Searching Authority, 8 pages.
International Searching Authority, International Search Report—International Application No. PCT/2015/060840, dated Mar. 8, 2016, together with the Written Opinion of the International Searching Authority, 13 pages.
International Searching Authority, International Search Report—International Application No. PCT/US2016/013416, dated Jun. 8, 2016, together with the Written Opinion of the International Searching Authority, 12 pages.
International Searching Authority, International Search Report—International Application No. PCT/US2016/026938, dated Jul. 28, 2016, together with the Written Opinion of the International Searching Authority, 9 pages.
International Searching Authority, International Search Report—International Application No. PCT/US2016/062033, dated Mar. 7, 2017, together with the Written Opinion of the International Searching Authority, 10 pages.
International Searching Authority, International Search Report—International Application No. PCT/US2018/021182, dated Jun. 13, 2018, together with the Written Opinion of the International Searching Authority, 12 pages.

* cited by examiner

ROUTER DEVICE USING FLOW DUPLICATION

PRIORITY

This patent application claims priority from provisional U.S. patent application No. 62/468,299, filed Mar. 7, 2017, entitled, "ROUTING DEVICE USING FLOW DUPLICATION," and naming Sarah V. Jaffer, Michael Baj, Patrick Timmons, and Patrick J. MeLampy as inventors, the disclosure of which is incorporated herein, in its entirety, by reference.

RELATED APPLICATIONS

This patent application is related to U.S. Pat. No. 9,729,439, issued Aug. 8, 2017, entitled, "NETWORK PACKET FLOW CONTROLLER," the disclosure of which is incorporated herein, in its entirety, by reference.

FIELD OF THE INVENTION

The invention generally relates to computer networks and, more particularly, the invention relates to routing packets across computer networks.

BACKGROUND OF THE INVENTION

Real time audio or video requires very low latency and very low packet loss. These protocols are designed to be bitwise efficient, so they frequently only transmit changes from a prior frame ("deltas"). Although this saves bandwidth, transmitting deltas causes extensive degradation when packet loss occurs. For example, ADPCM (Adaptive Differential Pulse Code Modulation) is a widely-used CODEC for voice telephony. A single sample requires quantization information from previous samples to properly interpret the coding and regenerate the voice. This technique, however, produces jitter and significant loss of fidelity when even a small number of packets are lost. As another example, MPEG4 is a video encoder that sends complete frames of pixels (super frames) periodically and just "deltas" between these. Again, a small number of dropped packets undesirably can cause "pixelation," rendered as visible artifacts, for an extended period of time (the time between super frames).

SUMMARY OF VARIOUS EMBODIMENTS

In accordance with one embodiment of the invention, a method of routing a plurality of packets (of a part of a session) across a network toward a destination modifies each packet to include a sequence number that is different from the sequence number of other packets in the plurality of packets. Accordingly, at this point, each of the plurality of packets is transformed into a corresponding plurality of processed packets. The method also duplicates the plurality of processed packets to produce a corresponding plurality of duplicated packets. Next, the method forwards the plurality of processed packets toward the destination using a first stateful path through the network, and correspondingly forwards the plurality of duplicated packets toward the destination using a second stateful path through the network. In preferred embodiments, the first stateful path is different from the second stateful path. For example, the two paths may be entirely distinct in that they share no common intermediary elements.

The method may modify each packet by adding the sequence number as metadata at the end of each of the plurality of packets. In addition or alternatively, the method may modify each packet to include a new checksum.

Some embodiments receive both the plurality of processed packets and the duplicated packets, and eliminate redundant packets from the processed packets and the duplicated packets to produce a plurality of remaining packets. Next, the method may forward the plurality of remaining packets toward the destination (e.g., a server in a local network). In addition, some embodiments remove the sequence numbers from the plurality of remaining packets to produce new checksum values after removing the initial sequence numbers from the plurality of remaining packets.

The method may forward via different paths using a variety of techniques. For example, the method may forward the plurality of processed packets using a first router interface of a router, and forward the plurality of duplicated packets using a second router interface of the router. Indeed, the first stateful path is different from the second stateful path. For the session, the first and second stateful paths preferably are prescribed prior to forwarding, and are bi-directional, although they may be unidirectional.

The first and second stateful paths preferably are prescribed prior to forwarding to include at least one AIPR. Moreover, the session may be formed from two pluralities of packets: the prior noted plurality of packets and a second plurality of packets. The method may operate to not modify the second plurality of packets. In some embodiments, an AIPR receives one of the plurality of processed packets or the plurality of duplicated packets, and forwards the received packets without modifying each packet to include or remove a sequence number. In other words, the AIPR in this case acts as a pass-through.

The plurality of processed packets may be stored in memory after modifying. In that case, the method also may retrieve the plurality of processed packets from memory and duplicate the retrieved processed packets to produce the corresponding plurality of duplicated packets. Although it uses stateful paths, illustrative embodiments may operate in an IP network.

In accordance with another embodiment of the invention, a routing device for routing a plurality of packets across an IP network toward a destination has a packet modifier configured to modify each packet to include a sequence number that is different from the sequence number of other packets in the plurality of packets. As such, the plurality of packets are transformed into a corresponding plurality of processed packets, and stored in memory. The routing device also has a packet duplicator, operatively coupled with the memory, configured to duplicate the plurality of processed packets to produce a corresponding plurality of duplicated packets. To forward packets, the routing device also has an output operatively coupled with the packet duplicator. The output is configured to forward the plurality of processed packets toward the destination using a first stateful path through the network. In addition, the output is configured to forward the plurality of duplicated packets toward the destination using a second stateful path through the network. As with other embodiments, the first stateful path is different from the second stateful path.

Illustrative embodiments of the invention are implemented as a computer program product having a computer usable medium with computer readable program code thereon. The computer readable code may be read and utilized by a computer system in accordance with conventional processes.

BRIEF DESCRIPTION OF THE DRAWINGS

Those skilled in the art should more fully appreciate advantages of various embodiments of the invention from the following "Description of Illustrative Embodiments," discussed with reference to the drawings summarized immediately below.

DESCRIPTION OF ILLUSTRATIVE EMBODIMENTS

In illustrative embodiments, a network device more reliably routes a stream of packets across a network from a source to a destination. To that end, the network device (e.g., a router) preferably modifies the stream of packets, and then duplicates the modified stream of packets. The network device also forwards substantially identical packets toward the destination using different stateful network paths. For example, the network device may forward a first stream toward the destination device using a first stateful path, and a second, substantially identical stream toward the destination using a different, second stateful path. The destination device (or a network device upstream of the destination device) restores the packets to their original format and forwards one set of the restored packets for use by a conventional network device (e.g., a server, mobile phone, tablet, or personal computer). Details of various embodiments are discussed below.

Networks

Illustrative embodiments preferably are implemented on a conventional computer network. Among other things, a network includes at least two nodes and at least one link between the nodes. Nodes can include computing devices (sometimes referred to as hosts) and routers. Computers include personal computers, smart phones, automatic teller machines (ATMs) and many other types of equipment that include processors and network interfaces. Links include wired and wireless connections between pairs of nodes. In addition, nodes and/or links may be implemented completely in software, such as in a virtual machine, a software defined network, and using network function virtualization. Many networks include switches, which are largely transparent for purposes of this discussion. However, some switches also perform routing functions. For the present discussion, such routing switches are considered routers. Routers are described below.

Figure 1:
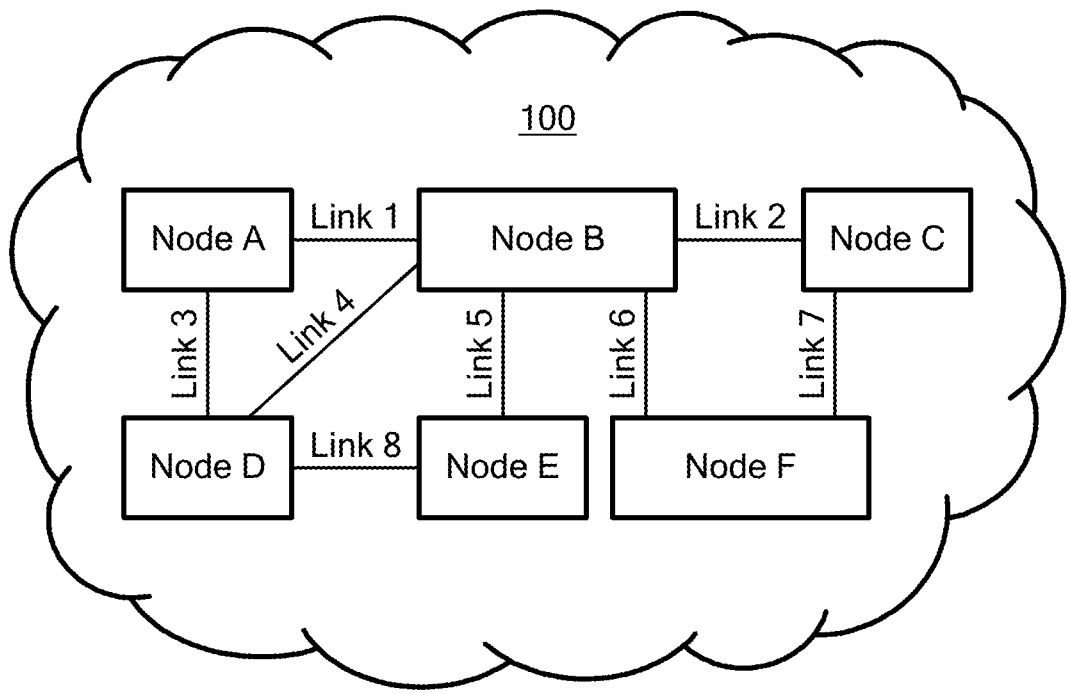
FIG. 1 schematically shows a hypothetical prior art network that may implement illustrative embodiments of the invention.

A node can be directly connected to one or more other nodes, each via a distinct link. For example, FIG. 1 schematically shows a Node A directly connected to Node B via Link 1. In a given network (e.g., within a local area network), each node has a unique network address to facilitate sending and receiving data. A network includes all the nodes addressable within the network according to the network's addressing scheme and all the links that interconnect the nodes for communication according to the network's addressing scheme. For example, in FIG. 1, Node A, Node B, Node C, . . . Node F and all the links 1-8 together make up a network 100. For simplicity, a network is depicted as a cloud or as being enclosed within a cloud.

Nodes initiate communications with other nodes via the network, and nodes receive communications initiated by other nodes via the network. For example, a node may transmit/forward/send data (a message) to a directly connected (adjacent) node by sending the message via the link that interconnects the adjacent nodes. The message includes the network address of the sending node (the "source address") and the network address of the intended receiving node (the "destination address"). A sending node can send a message to a non-adjacent node via one or more other nodes. For example, Node D may send a message to Node F via Node B. Using well known networking protocols, the node(s) between the source and the destination forward the message until the message reaches its destination. Accordingly, to operate properly, network protocols enable nodes to learn or discover network addresses of non-adjacent nodes in their network.

Nodes communicate via networks according to protocols, such as the well-known Internet Protocol (IP) and above noted Transmission Control Protocol (TCP). The protocols are typically implemented by layered software and/or hardware components according to the well-known seven-layer Open System Interconnect (OSI) model. As an example, IP operates at OSI Layer 3 (Network Layer), while the TCP operates largely at OSI Layer 4 (Transport Layer). Each layer performs a logical function and abstracts the layer below it, therefore hiding details of the lower layer.

Figure 2:
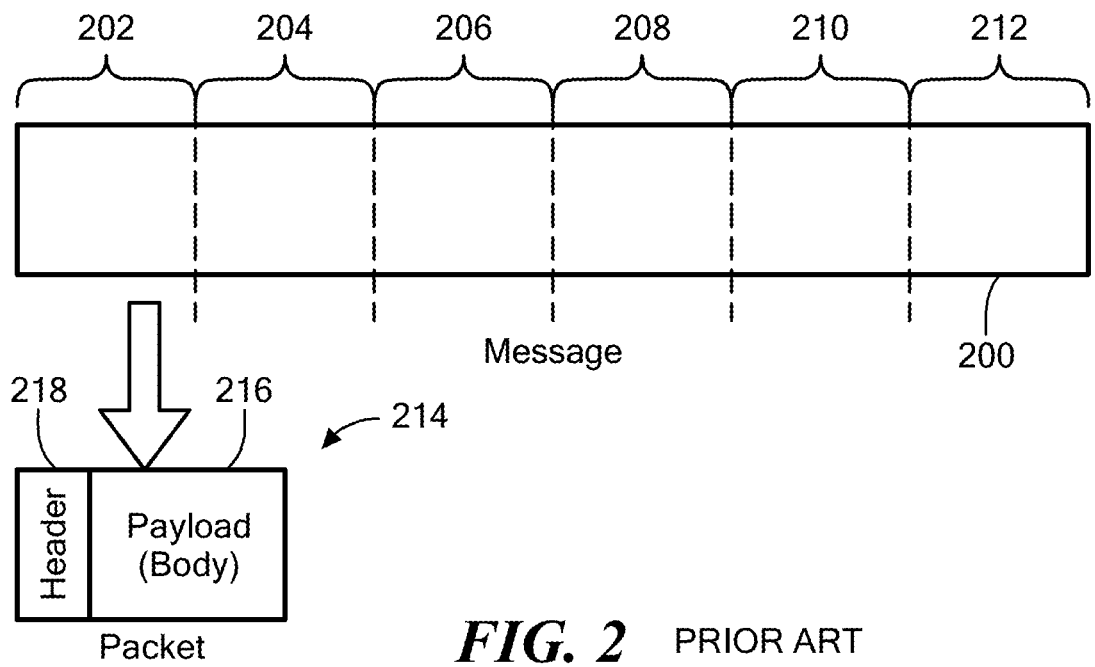
FIG. 2 schematically illustrates a prior art technique for fragmenting a message.

For example, Layer 3 may fragment a large message into smaller packets if Layer 2 (Data Link Layer) cannot handle the message as one transmission. FIG. 2 schematically illustrates a large message 200 divided into several pieces 202, 204, 206, 208, 210 and 212. Each piece 202-212 may then be sent in a separate packet, exemplified by packet 214. Each packet includes a payload (body) portion, exemplified by payload 216, and a header portion, exemplified at 218. The header portion 218 contains information, such as the packet's source address, destination address and packet sequence number, necessary or desirable for: 1) routing the packet to its destination, 2) reassembling the packets of a message, and 3) other functions provided according to the protocol. In some cases, a trailer portion is also appended to the payload, such as to carry a checksum of the payload or of the entire packet. All packets of a message need not be sent along the same path, i.e., through the same nodes, on their way to their common destination. It should be noted that although IP packets are officially called IP datagrams, they are commonly referred to simply as packets.

Some other protocols also fragment data into packets. For example, the well-known TCP protocol fragments data into segments, officially referred to as TCP protocol data units (PDUs). Nevertheless, in common usage, the term packet is used to refer to PDUs and datagrams, as well as Ethernet frames.

Most protocols encapsulate packets of higher layer protocols. For example, IP encapsulates a TCP packet by adding an IP header to the TCP packet to produce an IP packet. Thus, packets sent at a lower layer can be thought of as being made up of packets within packets. Conventionally, a component operating according to a protocol examines or modifies only information within a header and/or trailer that was created by another component, typically within another node, operating according to the same protocol. That is, conventionally, components operating according to a protocol do not examine or modify portions of packets created by other protocols.

In another example of abstraction provided by layered protocols, some layers translate addresses. Some layers include layer-specific addressing schemes. For example, each end of a link is connected to a node via a real (e.g., electronic) or virtual interface, such as an Ethernet interface. At Layer 2 (Data Link Layer), each interface has an address, such as a media access control (MAC) address. On the other hand, at Layer 3 using IP, each interface, or at least each node, has an IP address. Layer 3 is used to find gateways to get an IP packet from the source to the destination.

Figure 3:
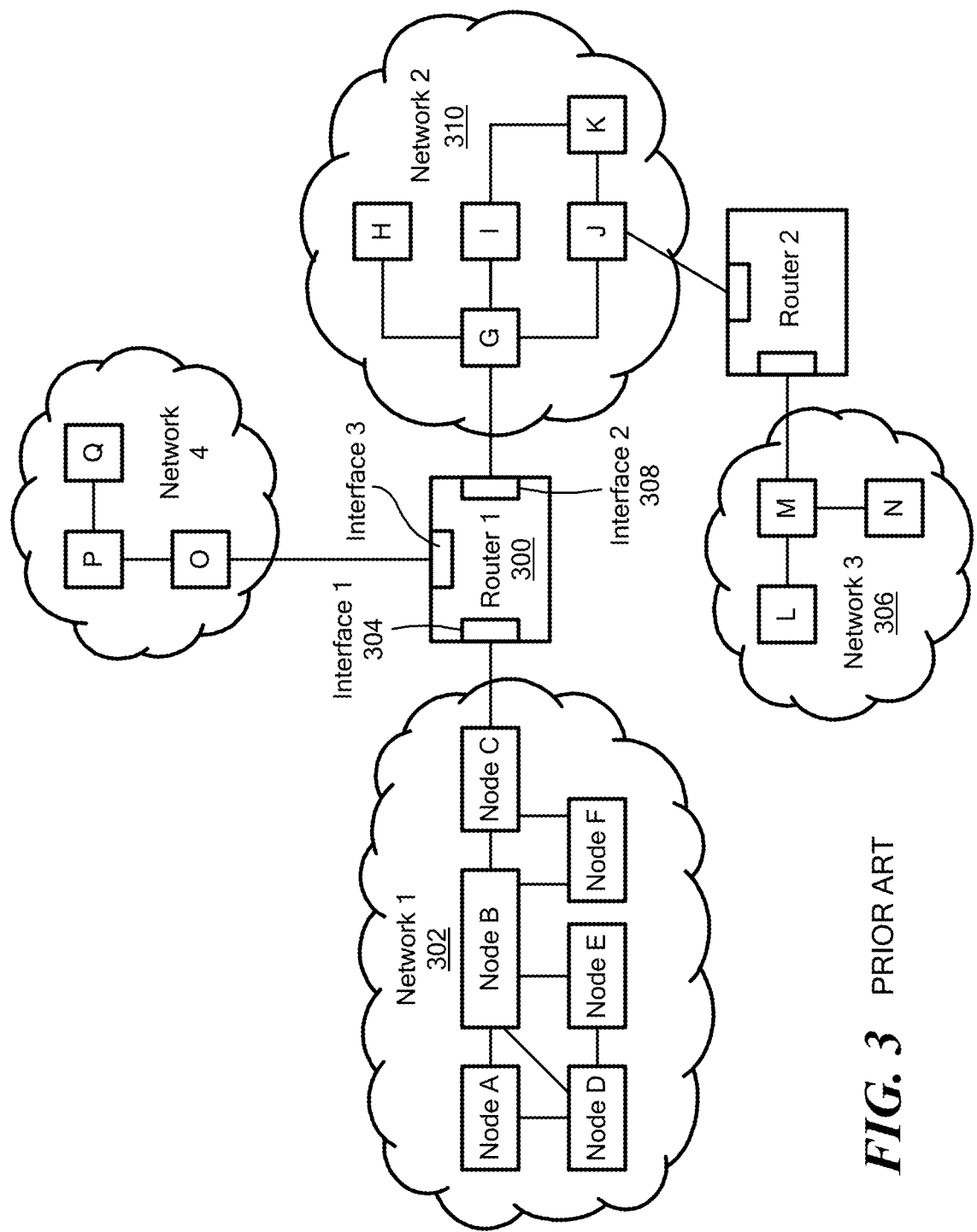
FIG. 3 schematically shows a hypothetical internet that may implement illustrative embodiments of the invention.

A router typically acts as a node that interconnects two or more distinct networks or two or more sub-networks (sub-nets) of a single network, thereby creating a "network of networks" (i.e., an internet). Thus, a router has at least two interfaces; i.e., one where each interface connects the router to a different network, as exemplified in FIG. 3. When a router receives a packet via one interface from one network, it uses information stored in its routing table to direct the packet to another network via another interface. The routing table thus contains network/next hop associations. These associations tell the router that a particular destination can optimally be reached by sending the packet to a specific router that represents a next hop on the way to the final destination. For example, if Router 1 300 receives a packet, via its Interface 1 304, from Network 1 302, and the packet is destined to a node in Network 3 306, the Router 1 300 consults its router table and then forwards the packet via its Interface 2 308 to Network 2 310. Network 2 310 will then forward the packet to Network 3 306. The next hop association can also be indicated in the routing table as an outgoing (exit) interface to the final destination.

Large organizations, such as large corporations, commercial data centers and telecommunications providers, often employ sets of routers in hierarchies to carry internal traffic. For example, one or more gateway routers may interconnect each organization's network to one or more Internet service providers (ISPs). ISPs also employ routers in hierarchies to carry traffic between their customers' gateways, to interconnect with other ISPs, and to interconnect with core routers in the Internet backbone.

A router is considered a Layer 3 device because its primary forwarding decision is based on the information in the Layer 3 IP packet—specifically the destination IP address. A conventional router does not look into the actual data contents (i.e., the encapsulated payload) that the packet carries. Instead, the router only looks at the Layer 3 addresses to make a forwarding decision, plus optionally other information in the header for hints, such as quality of service (QoS) requirements. Once a packet is forwarded, a conventional router does not retain any historical information about the packet, although the forwarding action may be collected to generate statistical data if the router is so configured. Illustrative embodiments discussed below relate to an improved apparatus and method for optimizing statistical data generation and collection.

As noted, when a router receives a packet via one interface from one network, the router uses its routing table to direct the packet to another network. Table 1 lists information typically found in a basic IP routing table.

TABLE 1

| | |
|---|---|
| Destination | Partial IP address (Expressed as a bit-mask) or Complete IP address of a packet's final destination |
| Next hop | IP address to which the packet should be forwarded on its way to the final destination |
| Interface | Outgoing network interface to use to forward the packet |
| Cost/Metric | Cost of this path, relative to costs of other possible paths |
| Routes | Information about subnets, including how to reach subnets that are not directly attached to the router, via one or more hops; default routes to use for certain types of traffic or when information is lacking |

Routing tables may be filled in manually, such as by a system administrator, or dynamically by the router. The router uses routing protocols to exchange information with other routers and, thereby, dynamically learns about surrounding network or internet topology. For example, routers announce their presence in the network(s), more specifically, the range of IP addresses to which the routers can forward packets. Neighboring routers update their routing tables with this information and broadcast their ability to forward packets to the network(s) of the first router. This information eventually spreads to more distant routers in a network. Dynamic routing allows a router to respond to changes in a network or internet, such as increased network congestion, new routers joining an internet and router or link failures.

A routing table therefore provides a set of rules for routing packets to their respective destinations. When a packet arrives, a router examines the packet's contents, such as its destination address, and finds the best matching rule in the routing table. The rule essentially tells the router which interface to use to forward the packet and the IP address of a node to which the packet is forwarded on its way to its final destination IP address.

With hop-by-hop routing, each routing table lists, for all reachable destinations, the address of the next node along a path to that destination, i.e., the next hop. Assuming that the routing tables are consistent, a simple algorithm of each router relaying packets to their destinations' respective next hop suffices to deliver packets anywhere in a network. Hop-by-hop is a fundamental characteristic of the IP Internetwork Layer and the OSI Network Layer.

Thus, each router's routing table typically merely contains information sufficient to forward a packet to another router that is "closer" to the packet's destination, without a guarantee of the packet ever being delivered to its destination. In a sense, a packet finds its way to its destination by visiting a series of routers and, at each router, using then-current rules to decide which router to visit next, with the hope that at least most packets ultimately reach their destinations.

Note that the rules may change between two successive hops of a packet or between two successive packets of a message, such as if a router becomes congested or a link fails. Two packets of a message may, therefore, follow different paths and even arrive out of order. In other words, when a packet is sent by a source node, there is no predetermined path the packet will take between the source node and the packet's destination. Instead, the path typically is dynamically determined as the packet traverses the various routers. This may be referred to as "natural routing," i.e., a path is determined dynamically as the packet traverses the internet.

It should be noted that conventionally, packets sent by the destination node back to the source node may follow different paths than the packets from the source node to the destination node.

In many situations, a client computer node establishes a session with a server computer node, and the client and server exchange packets within the session. For example, a client computer executing a browser may establish a session with a web server. The client may send one or more packets to request a web page, and the web server may respond with one or more packets containing contents of the web page. In some types of sessions, this back-and-forth exchange of packets may continue for several cycles. In some types of sessions, packets may be sent asynchronously between the two nodes.

A session has its conventional meaning; namely, it is a plurality of packets sent by one node to another node, where all the packets are related, according to a protocol. A session may be thought of as including a lead (or initial) packet that begins the session, and one or more subsequent packets of the session. A session has a definite beginning and a definite end. For example, a TCP session is initiated by a SYN packet. In some cases, the end may be defined by a prescribed packet or series of packets. For example, a TCP session may be ended with a FIN exchange or an RST. In other cases, the end may be defined by lack of communication between the nodes for at least a predetermined amount of time (a timeout time). For example, a TCP session may be ended after a defined timeout period. Some sessions include only packets sent from one node to the other node. Other sessions include response packets, as in the web client/server interaction example. A session may include any number of cycles of back-and-forth communication, or asynchronous communication, according to the protocol, but all packets of a session are exchanged between the same client/server pair of nodes. A session is also referred to herein as a series of packets.

A computer having a single IP address may provide several services, such as web services, e-mail services and file transfer (FTP) services. The number of addresses a computer has is orthogonal to the number of services it may provide, although it has at least one. Each service is typically assigned a port number in the range 0-65,535 that is unique on the computer. A service is, therefore, defined by a combination of the node's IP address and the service's port number. Note that this combination is unique within the network the computer is connected to, and it is often unique within an internet. Similarly, a single node may execute many clients. Therefore, a client that makes a request to a service is assigned a unique port number on the client's node, so return packets from the service can be uniquely addressed to the client that made the request.

The term socket means an IP address-port number combination. Thus, each service has a network-unique, and often internet-unique, service socket, and a client making a request of a service is assigned a network-unique, and sometimes internet-unique, client socket. In places, the terms source client and destination service are used when referring to a client that sends packets to make requests of a service and the service being requested, respectively.

Multi-Path Packet Stream Routing

Figure 4:
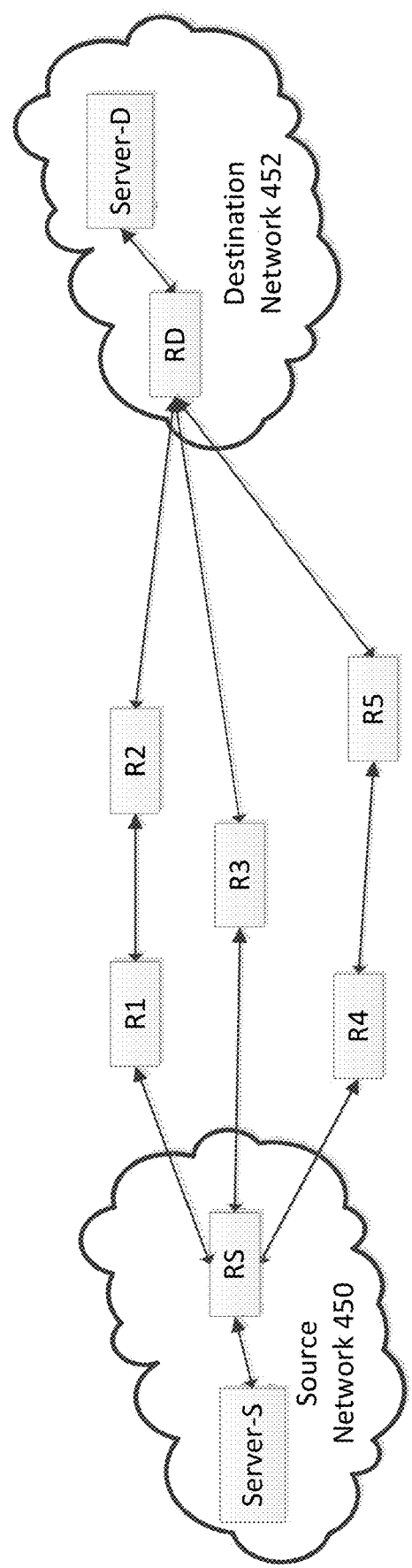
FIG. 4 schematically shows an example of a specific network that may implement illustrative embodiments of the invention.

As noted above, in illustrative embodiments, a network device more reliably routes a stream of packets across a network between a source and a destination. FIG. 4 schematically shows an exemplary network that may be used to implement various embodiments. The network of FIG. 4 is significantly simplified to more easily understand details of various embodiments of the invention. Accordingly, discussion of the network of FIG. 4 is merely for illustrative purposes only and thus, not intended to limit various embodiments of the invention to this particular network.

As shown, the network of FIG. 4 includes a source network 450 that communicates with a destination network 452 across a plurality of different intermediate network devices R1-R5. To that end, the source network 450 has a server (identified in the figure as "Server-S") that communicates with the intermediate network devices R1-R5 through a local source router RS. In illustrative embodiments, the local source router RS acts as an edge router for the source network 450. In a corresponding manner, the destination network 452 also has a server (identified in the figure as "Server-D") that communicates with the source network 450 using the intermediate network devices R1-R5 and a local destination router RD.

The intermediate network devices may be any of a variety of routing and switching devices. For illustrative purposes, the intermediate network devices are discussed herein as routers. It nevertheless should be noted that discussion of routers should not limit various embodiments of the invention. Moreover, the intermediate network devices may be connected/communicate in a variety of conventional manners. For example, they may communicate through the Internet, and/or be part of some administrative domain or local network.

The source network 450 and destination network 452 may transmit/forward any of a wide variety of different types of data. For example, the source network 450 may forward a request for a video or audio service. Thus, the destination network 452 may provide a video streaming service (e.g., NETFLIX™ or YOUTUBE™ services) to an end user back at the source network 450. As a second example, in response to a request for service from the source networks 450, the destination network 452 may provide an audio streaming service (e.g., PANDORA service) to an end user at the source network 450. It therefore should be noted that designation as "source" or "destination" networks 450 or 452 does not imply that they act solely in those capacities. Instead, the source network 450 may act as both a source and destination for certain traffic. In a similar manner, the destination network 452 may act as both as source and destination for certain traffic. Designation as source and destination networks 450 and 452 thus is for convenience as to the network that initiates a session and thus, is not intended to limit their functionality as both a destination and/or a source.

Indeed, as known by those skilled in the art, streaming audio and video preferably has a minimum amount of packet loss between the source network 450 and the destination network 452. Even modest packet loss can result in a significant reduction in the quality of an end user's viewing or listening experience. Moreover, as noted above, the source network 450, destination network 452, and intermediate network devices R1-R5 shown in FIG. 4 are significantly simplified to more easily understand various embodiments. Accordingly, the source network 450 and destination network 452 each may have a wide variety of additional devices, such as additional routers, computers, network appliances, additional servers, etc.

The routers RS and RD preferably have specialized functionality to more reliably forward a stream of packets between the source and destination networks 450 and 452. Moreover, one or more of the intermediate network devices R1-R5 may have similar functionality. To that end, FIG. 5 schematically shows a router having a plurality of components that together provide the noted functionality.

Each of these components is operatively connected by any conventional interconnect mechanism. FIG. 5 simply shows a bus 454 communicating each the components. Those skilled in the art should understand that this generalized representation can be modified to include other conventional direct or indirect connections. Accordingly, discussion of the bus 454 is not intended to limit various embodiments.

Figure 5:
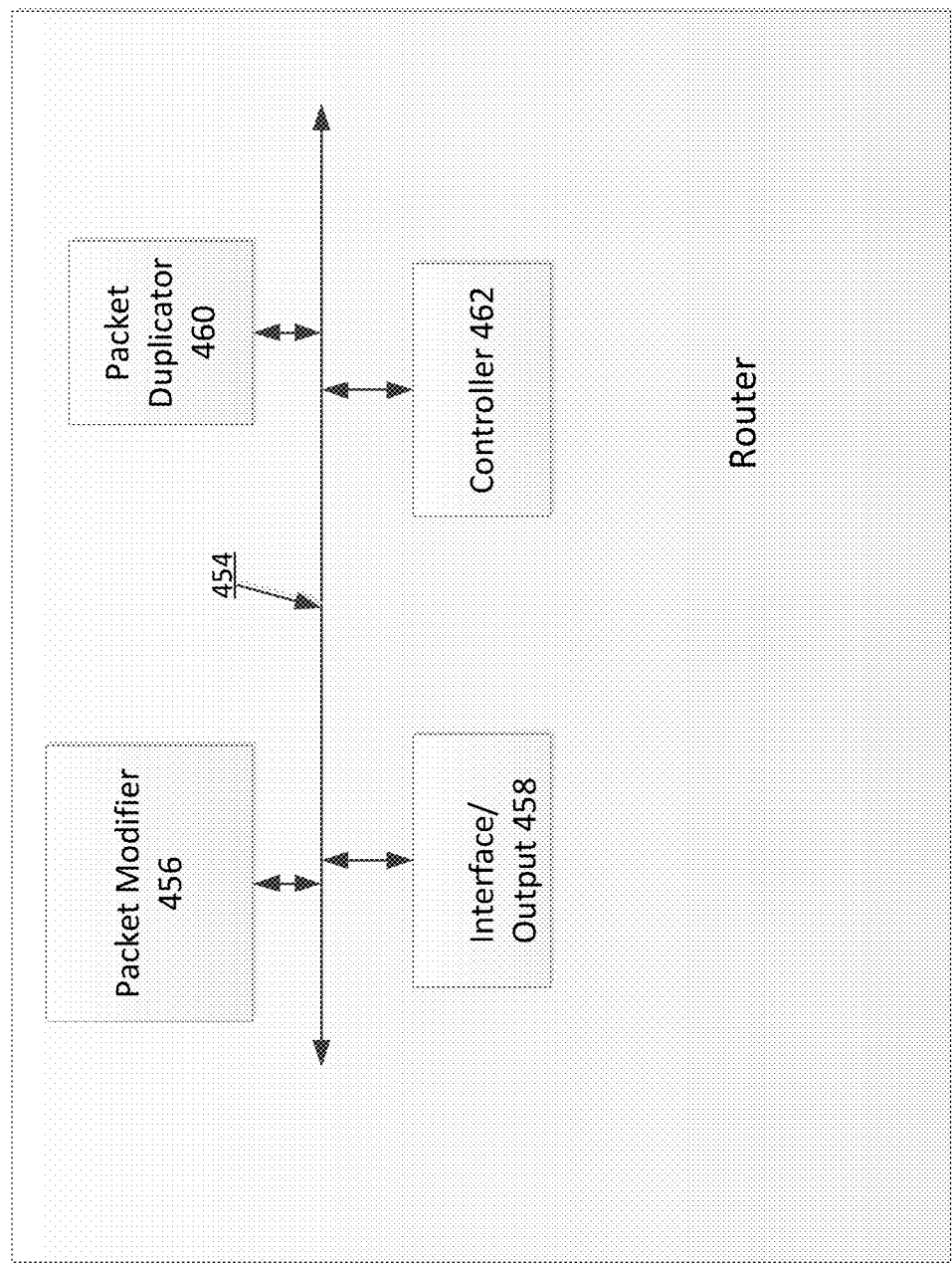
FIG. 5 schematically shows a router configured in accordance with illustrative embodiments of the invention.

Indeed, it should be noted that FIG. 5 only schematically shows each of these components. Those skilled in the art should understand that each of these components can be implemented in a variety of conventional manners, such as by using hardware, software, or a combination of hardware and software, across one or more other functional components. For example, the packet modifier (discussed below and identified in FIG. 5 using reference number 456) may be implemented using a plurality of microprocessors executing firmware. As another example, the packet modifier 456 may be implemented using one or more application specific integrated circuits (i.e., "ASICs") and related software, or a combination of ASICs, discrete electronic components (e.g., transistors), and microprocessors. Accordingly, the representation of the packet modifer and other components in a single box of FIG. 5 is for simplicity purposes only. In fact, in some embodiments, the packet modifier 456 (or other component) of FIG. 5 is distributed across a plurality of different machines—not necessarily within the same housing or chassis.

It should be reiterated that the representation of FIG. 5 is a significantly simplified representation of an actual router. Those skilled in the art should understand that such a device has many other physical and functional components, such as central processing units, one or more additional interfaces for receiving and transmitting packets, other packet processing modules, memory containing routing tables, and short-term memory. Accordingly, this discussion is not intended to suggest that FIG. 5 represents all of the elements of a router.

The router with this functionality thus has the above noted packet modifier 456, which modifies packets before sending them through an interface/output 458 of the router (often simply referred to as "output 458"). The output 458 may act, at least in part, as a general interface with multiple ports of one or two types. As with other blocks in the figures, merely showing it as one block is for simplicity purposes. It may represent many interfaces, either for input, output, or both.

After the packet modifier 456 modifies packets, a packet duplicator 460 duplicates the modified packets for forwarding through the output 458 along a different path. Accordingly, as noted above and discussed in greater detail below with reference to FIGS. 6 and 7, both the modified packet stream and the duplicated packet stream are forwarded through the output 458 across different paths. The router also may have a controller 462 that assists the processes of FIGS. 6 and 7, as well as assisting with or controlling various routing processes (e.g., stateful routing, discussed below, and/or conventional routing).

Figure 6:
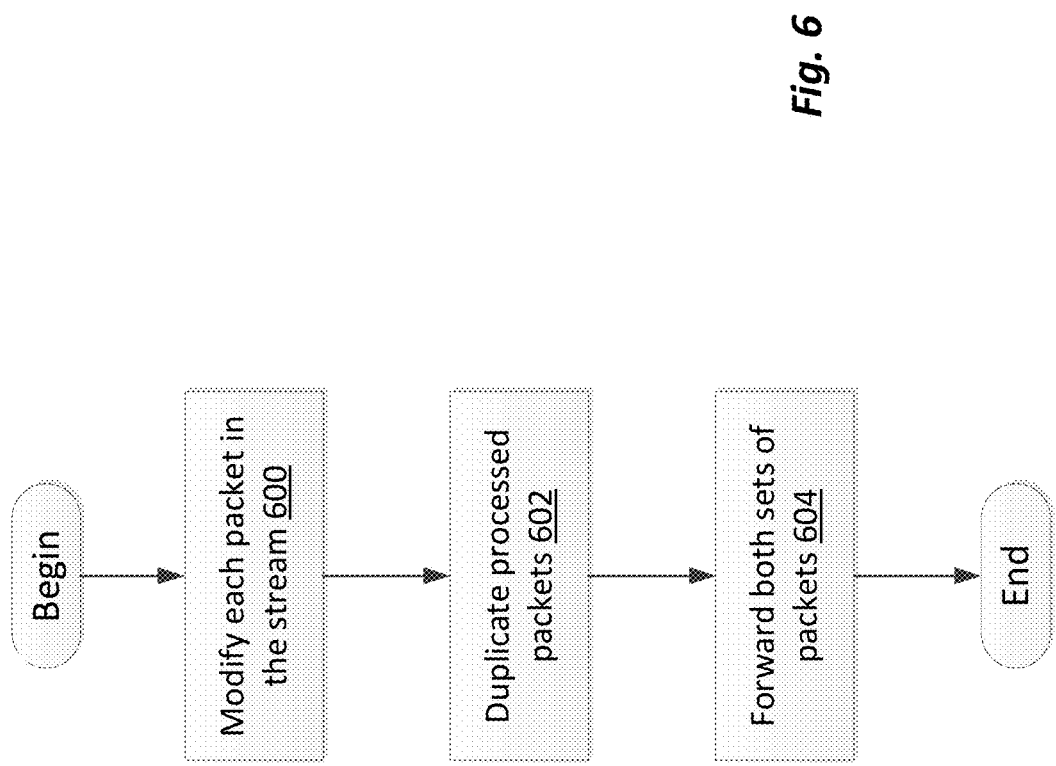
FIG. 6 shows a process of modifying a stream of packets in accordance with illustrative embodiments of the invention.

FIG. 6 shows a process used by the router RS of the source network 450 for preparing and forwarding a stream of packets to the destination network 452 in accordance with illustrative embodiments of the invention. In a corresponding manner, FIG. 7 shows a process used by the router RD of the destination network 452 for processing two duplicate streams of packets, and preparing those packets for use by a local network device.

Figure 7:
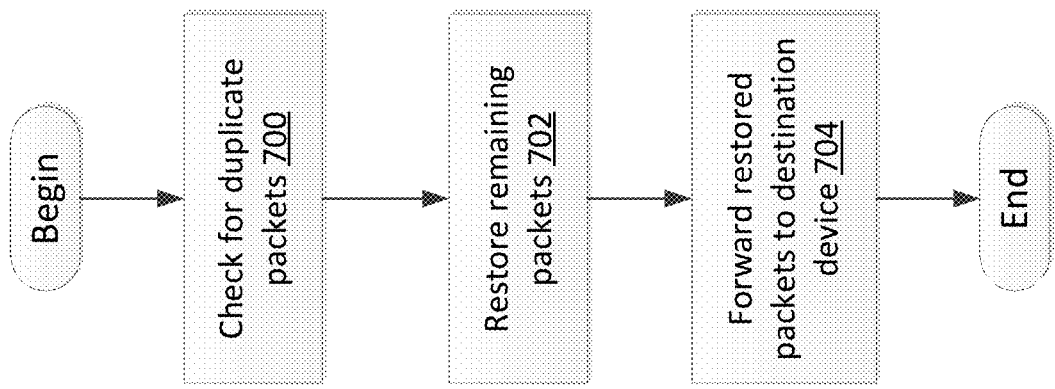
FIG. 7 shows a process used by a router to restore a received stream of packets in accordance with illustrative embodiments of the invention.

It should be noted that this processes of FIGS. 6 and 7 are substantially simplified from longer process that may be used to route packets. Accordingly, the process may have many steps, such as encapsulation, encryption, further processing, etc., which those skilled in the art likely would use. In addition, some of the steps may be performed in a different order than that shown, or at the same time. Those skilled in the art therefore can modify the process as appropriate.

The process of FIG. 6 begins at step 600, in which the router uses the functionality of FIG. 5 to modify each packet in the stream of packets for a given session. In alternative embodiments, however, a smaller set of packets in the given session are processed in this manner, while another plurality of packets in the same session are not. Accordingly, discussion of processing "each" packet may mean processing only a sub-set of the plurality of packets of a given session—processing each of those packets in the sub-set of packets.

After they are formed, each packet in the stream of packets is stored in a local buffer or memory of the router. For example, that memory may be internal memory or external memory. After they are formed, the packet modifier 456 determines the sequence number of each packet in the stream, and adds data to each packet indicating its own unique sequence number.

For example, each packet may be assigned a sequence number between 1 and 50, with no two packets having the same sequence number. The order of the numbering does not necessarily depend on whether the packets are received in a prescribed order. In preferred embodiments, the sequence number is added to each packet as metadata in a convenient location of the packet. For example, the sequence number may be added to the beginning or at the end of the packet. As another example, the sequence number may be added to a part of the packet that is not at the beginning or the end, such as between the header and the payload of the packet.

Undesirably, adding the metadata in this manner thus increases the size of the packet. Despite that, contrary to the state of the art, which often strives to reduce packet size, the inventors still pressed ahead by recognizing that such an increase is offset by the vastly improved reliability of the session. Accordingly, for each packet, the packet modifier 456 calculates a revised checksum based upon the additional data added to the respective packets, and substitutes this revised checksum for the current checksum. At this point the process, each packet therefore now has metadata indicating a sequence number in the stream of packets, as well as a new checksum value. It should be noted that this process may be done serially and not necessarily for all processed packets in the stream in parallel. For example, step 600 may be executed for some packets while steps 602 and 604 respectively (discussed below) are executing other packets already processed by steps 600 and 602 respectively. In fact, all of the steps of this process may be executing at the same time on different packets.

After modifying one or more of the packets in the data stream, the process continues to step 602, in which the packet duplicator 460 retrieves the modified packets from local memory (the "modified stream of packets") and duplicates such packets for subsequent transmission (the "duplicated stream of packets").

The process concludes at step 604, in which the output 458 forwards both streams of packets from the router toward the destination network 452. More specifically, the output 458 of the router forwards the modified stream of packets toward the destination network 452 using a first stateful network path, and the duplicated stream of packets toward the destination using a second stateful network path. In accordance with illustrative embodiments of the invention, the first stateful network path and second stateful network path are different. For example, the first stateful network path may take the path through routers R1 and R2, while the second stateful network path may take the path through routers R4 and R5. Accordingly, this technique provides two redundant, stateful paths to more reliably transmit the data stream. Alternative embodiments may use non-stateful paths.

The output 458 may use any of a variety of methods to ensure that the two streams use different network paths. For example, the output 458 may forward the modified stream of packets using a first interface on the router, and the duplicated stream of packets using a second interface on the same router. While this should provide satisfactory results in many instances, preferred embodiments use two different prescribed paths to the destination network 452 using techniques described below with regard to stateful routing. For example, as described in greater detail below, the router may have logic that formulates a first prescribed path using certain specified nodes between the router RS and the destination network 452, and a second prescribed path using certain other specified nodes between the router RS and the destination network 452. These paths may be unidirectional/one-directional, or bi-directional (transmission in two opposite directions between the source and destination networks 450 and 452 in the same session). Accordingly, a link failure or other transmission problem in one path should not affect the other path.

Accordingly, the two streams of packets traverse the various network devices along their separate paths. Using the exemplary paths discussed above with regard to FIG. 4, the routers R1 and R2 will simply route the stream of modified packets in the manner specified (e.g., statefully or using natural routing) to the destination router RD. In a corresponding manner, the routers R4 and R5 will simply route the stream of duplicated packets in the manner specified. For example, routers R4 and R5 may be augmented IP routers ("AIPRs," discussed below) and thus, implement stateful routing. The network also may have other conventional, non-stateful network devices (e.g., conventional routers) that connect the routers R4 and R5.

Upon receipt, the receiving router RD executes the process of FIG. 7 to reliably complete the process of forwarding the stream of packets. Specifically, the router RD receives both streams of packets from the two different paths. As it receives the two streams and recognizes that they are from the same origin stream of packets/session, it eliminates duplicate packets to leave a remaining stream of packets for further processing (step 700). To that end, the router RD may maintain a database or checklist of packets it has received based on the sequence numbers of the packets. Accordingly, when it receives a second version of the same packet, the router RD discards the second version packet. That second version of the same packet may be from either stream of packets—either the modified stream of packets or the duplicate stream of packets.

Using the above noted stream of 50 packets as an example, the receiving router RD may receive the following packets in the following order, based on the sequence number:

Sequence Number: 2, 40, 36, 1, 8, 40, 50, 36, 22 . . . (other packets received subsequently)

In this case, the controller 462 in the receiving router RD recognizes that it has received packets 40 and 36 twice. Accordingly, the receiving router RD forwards the other packets on to the packet modifier 456 for further processing while discarding the second versions of packets 40 and 36. As noted above, the second versions of packets 40 and 36 may have been part of either the modified stream of packets or the duplicated stream of packets.

The process of FIG. 7 therefore continues to step 702, in which the packet modifier 456 of the router RD restores the remaining packets to their original form. To that end, for each packet it receives, the packet modifier 456 removes the sequence number from the metadata, decreases the size of the packet, and then re-computes the checksum for the packet (could be the same checksum as originally calculated for the packet). After replacing the checksum with this re-computed checksum, the process continues to step 704, in which the output 458 forwards the restored packets to the destination device (e.g., a server) for ultimate use and/or consumption.

It should be noted that the router executing the process of FIG. 7 (RD in this example) may not necessarily be a part of the destination network 452. Specifically, the router executing FIG. 7 may be logically or physically upstream of the destination network 452 and instead, rely upon conventional routing techniques for the remainder of the path to the destination network 452. In a similar manner, the router executing the process of FIG. 6 (RS in this example) also may be external to the source network 450. Accordingly, the router RS may be logically or physically downstream of the source network 450.

Among other things, illustrative embodiments may provide some or all of the following benefits:

1.) Redundancy when a link completely fails,

2.) Placing a sequence number in the end of the packet is efficient, avoiding the need to move the packet data to insert it in the header or other field, 3.) Using an external and new sequence number makes this usable for a wide variety of protocols. For example, various embodiments should be compatible with a variety of transport protocols, such as TCP or UDP protocol, including RTP or QUIC, 4.) Using AIPRs for routing (discussed below) avoids the additional overhead of tunnels, and allows restoration of the address upon exit, 5.) The likelihood of two packets being dropped on both interfaces is low, enhancing redundancy and reliability, 6.) Relatively little microprocessor capacity is required to duplicate a packet since it is transmitted twice from the same memory.

Stateful Routing

As discussed above, in some embodiments, the stream of packets forwarded between the source network 450 and the destination network 452 are part of a session that follows the same path as the lead packet of that session, at least in the forward direction, i.e., from a source client to a destination service. The subsequent packets traverse at least a subset of the routers the lead packet traverses between the source client and the destination service. Among other benefits, this stateful routing scheme more effectively enhances the benefits of collecting routing statistics. Those skilled in the art may implement such a stateful routing scheme with the configuration functionality of the administrative domain 312.

Each router in the subset is referred to herein as an intermediate node or waypoint, although the waypoints are not necessarily predetermined before the lead packet is sent by the source client. The lead packet may be naturally routed, or routed by a pre-specified path. It should be noted that although the discussion below describes use of natural routing, it should not limit various embodiments to such a scheme. If the path is not pre-specified, then the path taken by the lead packet establishes the waypoints. In either case, the subsequent packets traverse the same waypoints, and in the same order, as the lead packet.

Of course, some packets may be dropped along the way, as is typical in an IP network or internet, such as by an overloaded router or due to corruption of the packet by a link. Thus, all the packets sent by the source client need not reach the session's destination service and, consequently, all the packets sent by the source client need not traverse all the waypoints. However, subsequent packets that do reach the destination service must traverse all the waypoints. For simplicity of explanation, dropped packets are ignored in the remaining discussion, and the term "all the packets" means all the packets that reach their respective destinations.

As a result of this forward flow control, metrics collected at one of the waypoints represent all the packets of the session. These metrics are not diluted by packets that bypass the waypoint, because no packet of the session can bypass any waypoint. Security functions, such as inspection for malicious packets, performed at one waypoint are sure to be performed on all packets of the session. Importantly, this enables statistics to be calculated for specific sessions.

Some embodiments also ensure that return packets from the destination service to the source client also follow the same path, i.e., traverse the waypoints, but in reverse order. This reverse flow control enables use of paths, such as via proprietary networks, that might not otherwise be available by naturally routing the return packets.

Figure 8:
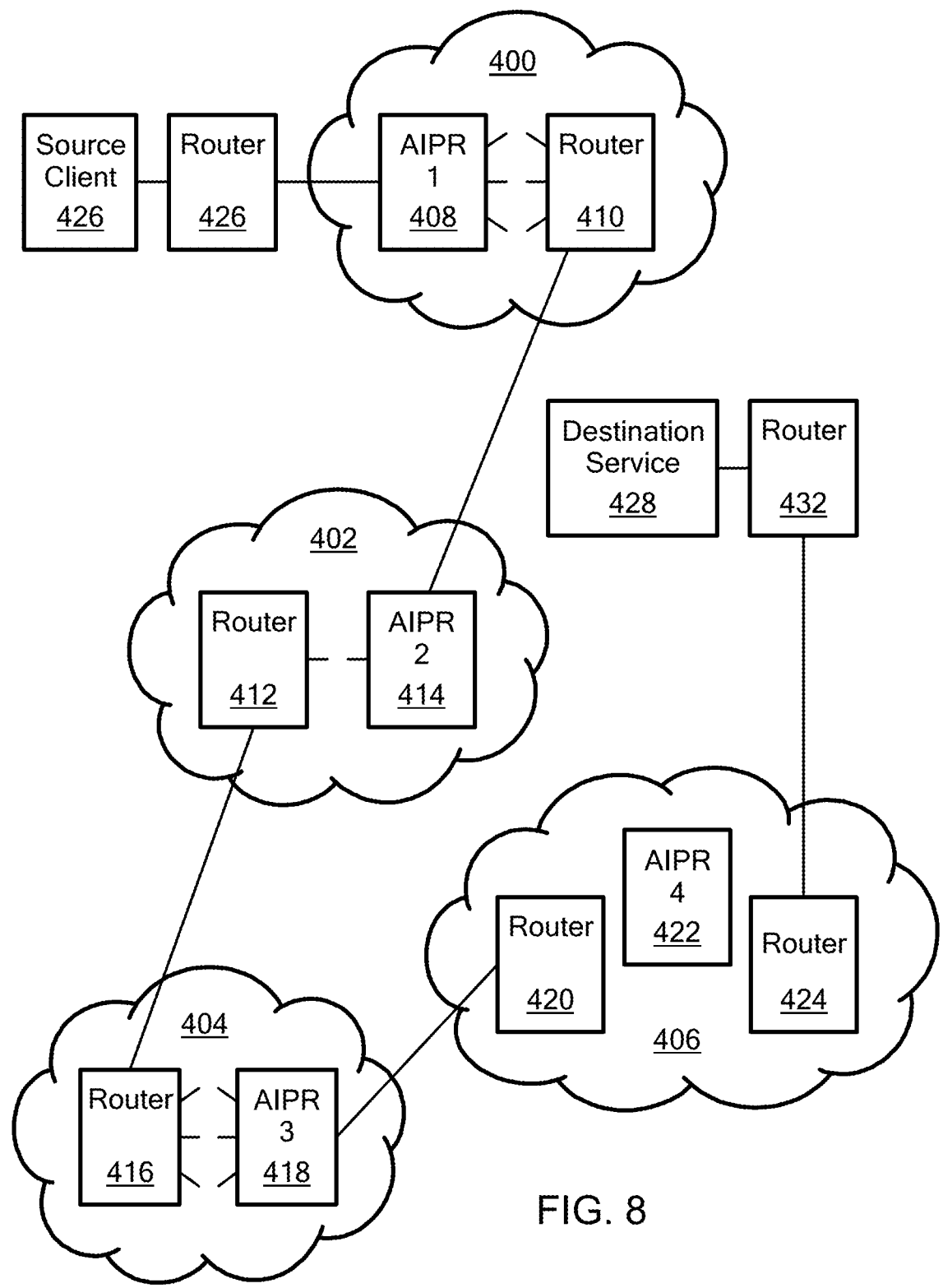
FIG. 8 schematically shows a hypothetical internet that includes a conventional routers and augmented IP routers (AIPRs), according to an embodiment of the present invention.

A packet flow controller (also referred to herein as an augmented IP router ("AIPR")) ensures that subsequent packets of a session follow the same path as the lead packet of the session, as discussed above. In fact, one or both of the routers RS and RD of FIG. 4 may be implemented as AIPRs/waypoints. An AIPR also performs conventional routing functions, and also those described above with regard to statistics collection. FIG. 8 is a schematic diagram illustrating a hypothetical set of interconnected networks 400, 402, 404 and 406, i.e., an internet. Each network 401-406 includes a number of routers and AIPRs, not all of which are necessarily shown. Network 401 includes AIPR1 408 and router 410. Network 401 may be, for example, a network of a telecommunications carrier. Network 402 includes a router 412 and AIPR 2 414. Network 402 may be, for example, a network of a first ISP. Network 404 includes a router 416 and AIPR 3 418. Network 404 may be, for example, the Internet backbone or a portion thereof. Network 406 includes a router 420, AIPR 4 422 and another router 424. Network 406 may be, for example, a network of a second ISP.

Assume a source client node 426 initiates a session with a destination service node 428. For example, the source client 426 may request a web page, and the destination service node 428 may include a web server. The source client 426 may, for example, be part of a first local area network (LAN) (not shown) within a first corporation, and the LAN may be connected to the telecommunications carrier network 401 via a gateway router 430 operated by the corporation. Similarly, the destination service node 428 may be operated by a second corporation, and it may be part of a second LAN (not shown) coupled to the network 406 of the second ISP via a gateway router 432 operated by the second corporation. As a lead packet of the session traverses the internet, each AIPR (waypoint) the packet traverses records information that eventually enables the waypoint to be able to identify its immediately previous waypoint and its immediately next waypoint, with respect to the session.

The lead packet of the session is naturally routed. Assume the lead packet reaches AIPR 1 408 before it reaches network 402, 404 or 406. AIPR 1 408 automatically identifies the lead packet as being an initial packet of the session. AIPR 1 408 may use various techniques to identify the beginning of a session, as noted above and as discussed in more detail below. AIPR 1 408 becomes the first waypoint along a path the lead packet eventually follows.

AIPR 1 408 assigns a unique identifier to the session and stores information about the session in the AIPR's database to enable the AIPR 1 408 to identify subsequent packets of the session. In some embodiments, AIPR 1 408 reads the client socket/service socket number pair in the lead packet and stores the client socket/service socket number pair in a database to uniquely identify the session. This enables the AIPR 1 408 to identify the subsequent packets as being part of the session, because all subsequent packets of the session will contain the same client socket/service socket number pair.

In some embodiments, AIPR 1 408 sets a flag in its database to indicate the lead packet has not traversed any other AIPR before reaching AIPR 1 408. This flag may be used later, for example when the AIPR 1 408 handles return packets. AIPR 1 408 may be able to identify the lead packet as not having traversed any other AIPR by lack of any modification to the packet. Packet modification is described below.

AIPR 1 408 modifies the lead packet to indicate the lead packet has been handled by an AIPR. In some embodiments, the AIPR 1 408 stores the unique identifier of the session and, if not included in the unique identifier, the AIPR's network address in the packet to produce a modified lead packet. Subsequent AIPRs, if any, that handle the (now modified) lead packet use this modification to identify the lead packet as a lead packet that has been handled by an AIPR, and to indicate that subsequent packets of the session should be routed the same way as the lead packet is routed.

In some embodiments, AIPR 1 408 assigns a port number on the interface over which AIPR 1 408 will forward the lead packet. The AIPR's network address and this port number, in combination, may be used as a unique identifier of the session, at least from the point of view of the next AIPR along the path. AIPR 1 408 may include the AIPR's network address-port number combination in the modified lead packet. Thus, the next AIPR along the path may assume that subsequent packets sent from this network address-port number combination are part of, or likely to be part of, the session.

AIPR 1 408 then forwards the lead packet naturally. The lead packet traverses an unspecified number of nodes of network 401 until it reaches router 410, which naturally routes the lead packet to network 402. Assume the router 410 forwards the lead packet to AIPR 2 414 in network 402.

AIPR 2 414 detects the modification to the lead packet, identifying a need for special treatment. AIPR 2 414 becomes the second waypoint along the path the lead packet will follow. AIPR 2 414 stores in its database the network address of AIPR 1 408 and the port number assigned by AIPR 1 408, in association with a unique identifier of the session, such as the client and server socket number pair, thus identifying the previous waypoint along the path in association with the session. In this way, each waypoint learns the network address and port number of the previous waypoint along this session's path and uses a related association device (an "associator") to associate this information with a session identifier. This information may be used later to forward return packets, from waypoint to waypoint, back to the source client 426.

In some embodiments, AIPR 2 414 assigns a port number on the interface over which the lead packet was received. The AIPR's network address and this port number, in combination, may be used as a unique identifier of the session, at least from the point of view of AIPR 1 408. Thus, subsequent packets addressed to this network address-port number combination may be assumed to be, or at least are likely to be, part of the session.

In some embodiments, AIPR 2 414 sends a packet back to AIPR 1 408 to inform AIPR 1 408 of the network address-port number combination, in association with the identification of the session. In some embodiments, the network address-port number combination are sent to AIPR 1 408 later, in connection with a return packet, as described below. In either case, AIPR 1 408 learns a network address-port number combination unique to the session, and AIPR 1 408 sends subsequent packets to that address-port combination, rather than naturally forwarding the subsequent packets. In this way, each waypoint learns the network address and port number of the next waypoint along this session's path. This information is used to forward subsequent packets, from waypoint to waypoint, forward to the destination service 428, along the same path as the lead packet.

AIPR 2 214 modifies the lead packet to include the network address of AIPR 2 214, and then forwards the lead packet naturally. As with AIPR 1 408, in some embodiments AIPR 2 214 assigns a port number on the interface over which AIPR 2 214 forwards the packet, and the network address of AIPR 2 214 and the port number are included in the modified lead packet AIPR 2 214 sends.

The lead packet traverses an unspecified number of nodes of network 402, until it reaches router 412, which naturally routes the lead packet to network 404. Assume the router 416 forwards the lead packet to AIPR 3 418.

AIPR 3 418 becomes the third waypoint along the path the lead packet will follow. AIPR 3 418 operates much as AIPR 2 414. The lead packet is then forwarded to network 406, where it traverses AIPR 4 422, which becomes the fourth waypoint.

Three scenarios are possible with respect to the last AIPR 422 (AIPR 4) along the path to the destination service 428.

In the first scenario, one or more AIPRs relatively close to a destination service are provisioned to handle lead packets for the destination service. The AIPRs may be so provisioned by storing information in their databases to identify the destination service, such as by the service socket number or other unique identifier of the service. These "terminus" AIPRs broadcast their ability to forward packets to the destination service. A terminus AIPR is an AIPR that can forward packets to a destination service, without the packets traversing another AIPR. A terminus AIPR recognizes a lead packet destined to a service that terminates at the AIPR by comparing the destination service socket number to the information provisioned in the AIPR's database.

If AIPR 4 422 has been so provisioned, AIPR 4 422 may restore the lead packet to its original form, i.e., the form the lead packet had when the source client 426 sent the lead packet, or as the packet might have been modified by the router 430, such as a result of network address translation (NAT) performed by the router 430. Thus, the lead packet may be restored to a form that does not include any of the modifications made by the waypoints 408, 414 and 418. AIPR 4 422 then forwards the lead packet to the destination service 428. Like AIPR 3 418, AIPR 4 422 stores information in its database identifying AIPR 3 418 as the previous AIPR for this session.

In the second scenario, AIPR 4 422 is not provisioned with information about the destination service 428. In such embodiments, AIPR 4 422 may operate much as AIPR 2 414 and AIPR 3 418 operate. AIPR 4 422 modifies and naturally forwards the lead packet, and the lead packet is eventually delivered to the destination service 428. The destination service 428 responds to the lead packet. For example, if the lead packet is a SYN packet to initiate a TCP session, the destination service 428 responds with an ACK or SYN/ACK packet. AIPR 4 422 recognizes the return packet as being part of the session, such as based on the source client/destination service network address/port number pairs in the return packet. Furthermore, because the return packet was sent by the destination service 428, and not another AIPR, AIPR 4 422 recognizes that it is the last AIPR along the path for this service.

AIPR 4 422 stores information in its database indicating AIPR 4 422 is a terminus AIPR. If AIPR 4 422 receives subsequent packets of the session, AIPR 4 422 may restore the subsequent packets to their original forms, i.e., the forms the subsequent packets had when the source client 426 sent the subsequent packets, or as the packets might have been modified by the router 430, such as a result of network address translation (NAT) performed by the router 430. AIPR 4 422 forwards the subsequent packets to the destination service 428.

AIPR 4 422 modifies the return packet to include a port number on the interface AIPR 4 422 received the lead packet from AIPR 3 418, as well as the network address of AIPR 4 422. AIPR 4 422, then forwards the return packet to AIPR 3 418. Although the return packet may be forwarded by other routers, AIPR 4 422 specifically addresses the return packet to AIPR 3 418. This begins the return packet's journey back along the path the lead packet traveled, through all the waypoints traversed by the lead packet, in reverse order. Thus, the return packet is not naturally routed back to the source client 426.

AIPR 3 418 receives the modified return packet and, because the return packet was addressed to the port number AIPR 3 418 previously assigned and associated with this session, AIPR 3 418 can assume the return packet is part of, or likely part of, the session. AIPR 3 418 copies the network address and port number of AIPR 4 422 from the return packet into the AIPR's database as the next waypoint for this session. If AIPR 3 418 receives subsequent packets of the session, AIPR 3 418 forwards them to the network address and port number of the next waypoint, i.e., AIPR 4 422.

Thus, once an AIPR is notified of a network address and port number of a next AIPR along a session path, the AIPR forwards subsequent packets to the next AIPR, rather than naturally routing the subsequent packets.

AIPR 3 418 forwards the return packet to AIPR 2 414, whose network address and port number were stored in the database of AIPR 3 418 and identified as the previous waypoint of the session. Likewise, each of the waypoints along the path back to the source client 426 forwards the return packet to its respective previous waypoint.

When the first waypoint, i.e., AIPR 1 408, receives the return packet, the waypoint may restore the return packet to its original form, i.e., the form the return packet had when the destination service 428 sent the return packet, or as the packet might have been modified by the router 430, such as a result of network address translation (NAT) performed by the router 430. Recall that the first waypoint set a flag in its database to indicate the lead packet had not traversed any other waypoint before reaching the first waypoint. This flag is used to signal the first waypoint to restore the return packet and forward the restored return packet to the source client 426. The first waypoint forwards the return packet to the source client 426. Subsequent return packets are similarly handled.

In the third scenario, not shown in FIG. 8, the last AIPR to receive the lead packet has a network address equal to the network address of the destination service. For example, the destination service network address may be given to a gateway router/AIPR, and the gateway router/AIPR may either process the service request or its router table may cause the packet to be forwarded to another node to perform the service. The last AIPR may restore the lead packet and subsequent packets, as described above.

It should be noted that although preferred embodiments use stateful routing as noted above, other embodiments do not use stateful routing.

Lead Packet Identification

As noted, a waypoint should be able to identify a lead packet of a session. Various techniques may be used to identify lead packets. Some of these techniques are protocol-specific. For example, a TCP session is initiated according to a well-known three-part handshake involving a SYN packet, a SYN-ACK packet and an ACK packet. By statefully following packet exchanges between pairs of nodes, a waypoint can identify a beginning of a session and, in many cases, an end of the session. For example, A TCP session may be ended by including a FIN flag in a packet and having the other node send an ACK, or by simply including an RST flag in a packet. Because each waypoint stores information about each session, such as the source client/destination service network address/port number pairs, the waypoint can identify the session with which each received packet is associated. The waypoint can follow the protocol state of each session by monitoring the messages and flags, such as SYN and FIN, sent by the endpoints of the session and storing state information about each session in its database. Such stateful monitoring of packet traffic is not taught by the prior art known to the inventor. Instead, the prior art teaches away from this type of session.

It should be noted that a SYN packet may be re-transmitted—each SYN packet does not necessarily initiate a separate session. However, the waypoint can differentiate between SYN packets that initiate a session and re-transmitted SYN packets based on, for example, the response packets.

Where a protocol does not define a packet sequence to end a session, the waypoint may use a timer. After a predetermined amount of time, during which no packet is handled for a session, the waypoint may assume the session is ended. Such a timeout period may also be applied to sessions using protocols that define end sequences.

Table 2 describes exemplary techniques for identifying the beginning and end of a session, according to various protocols. Similar techniques may be developed for other protocols, based on the definitions of the protocols.

TABLE 2

| Protocol | Destination Port | Technique for Start/End Determination |
| --- | --- | --- |
| TCP | Any | Detect start on the first SYN packet from a new address/port unique within the TCP protocol's guard time between address/port reuse. Following the TCP state machine to determine an end (FIN exchange, RST, or guard timeout). |
| UDP-TFTP | 69 | Trap on the first RRQ or WRQ message to define a new session, trap on an undersized DAT packet for an end of session. |
| UDP-SNMP | 161, 162 | Trap on the message type, including GetRequest, SetRequest, GetNextRequest, GetBulkRequest, InformRequest for a start of session, and monitor the Response for end of session. For SNMP traps, port 162 is used, and the flow of data generally travels in the "reverse" direction. |
| UDP-SYSLOG | 514 | A single message protocol, thus each message is a start of session, and end of session. |
| UDP-RTP | Any | RTP has a unique header structure, which can be reviewed/analyzed to identify a start of a session. This is not always accurate, but if used in combination with a guard timer on the exact same five-tuple address, it should work well enough. The end of session is detected through a guard timer on the five-tuple session, or a major change in the RTP header. |

TABLE 2-continued

| Protocol | Destination Port | Technique for Start/End Determination |
|---|---|---|
| UDP-RTCP | Any | RTCP also has a unique header, which can be reviewed, analyzed, and harvested for analytics. Each RTCP packet is sent periodically and can be considered a "start of session" with the corresponding RTCP response ending the session. This provides a very high quality way of getting analytics for RTCP at a network middle point, without using a Session Border Controller |
| UDP-DNS (Nameserver) | 53 | Each DNS query is a single UDP message and response. By establishing a forward session (and subsequent backward session) the Augmented router gets the entire transaction. This allows analytics to be gathered and manipulations that are appropriate at the Augmented router. |
| UDP-NTP | 123 | Each DNS query/response is a full session. So, each query is a start, and each response is an end. |

Figure 9:
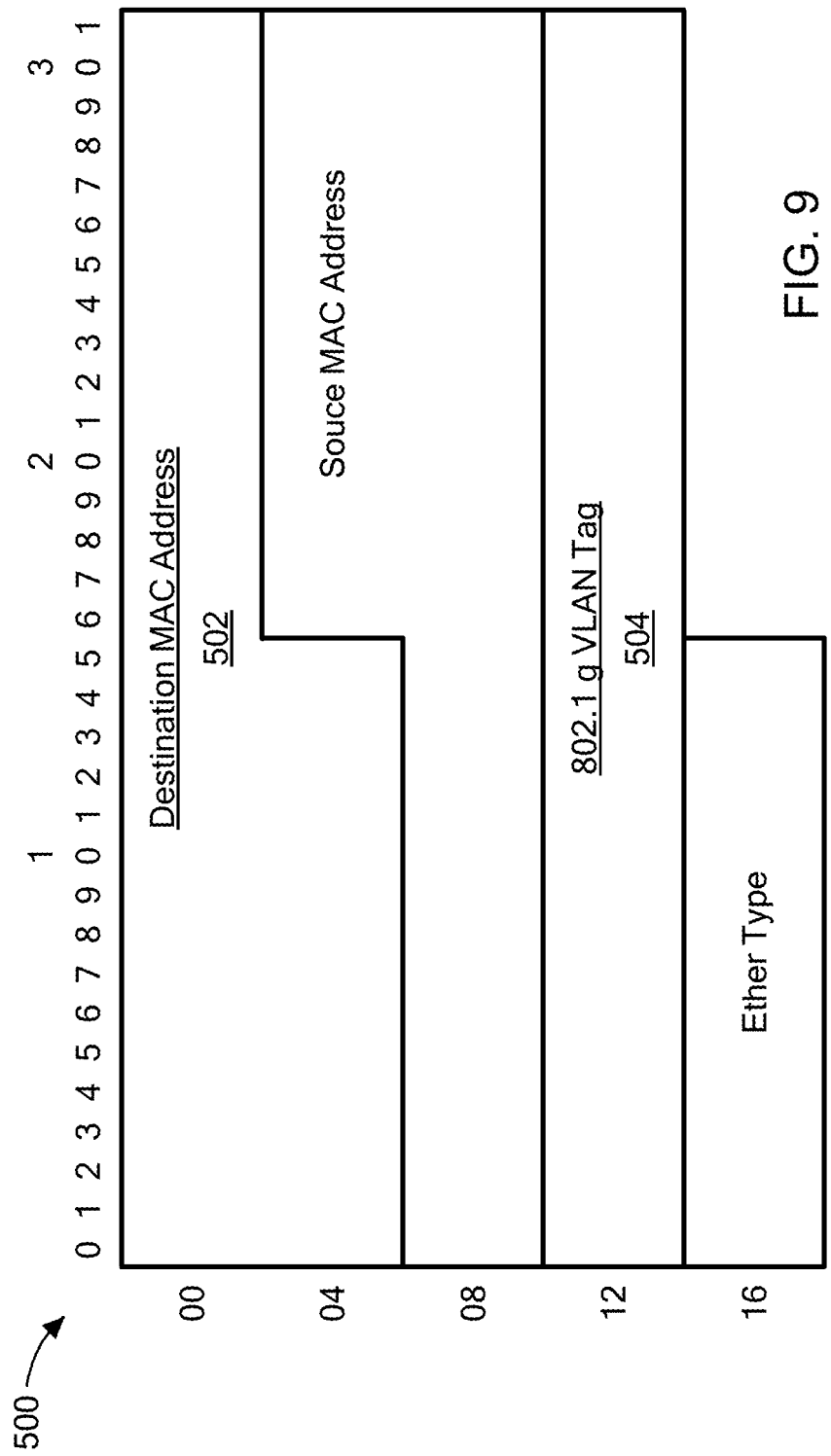
FIG. 9 schematically shows a layout of an Ethernet header, identifying fields used for identifying a beginning of a session, according to an embodiment of the present invention.
Figure 10:
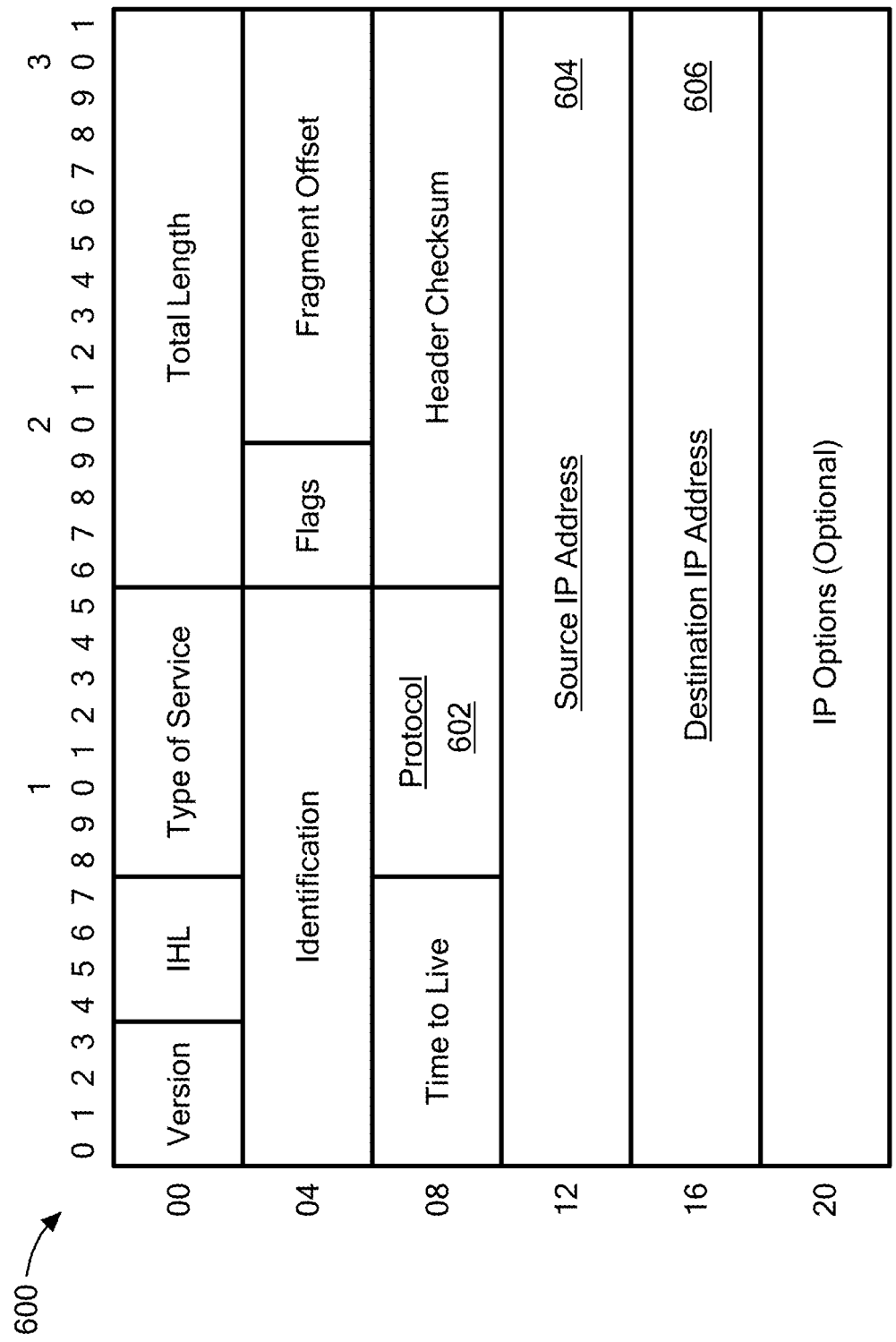
FIG. 10 schematically shows a layout of an IP header, identifying fields used for identifying a beginning of a session, according to an embodiment of the present invention.
Figure 11:
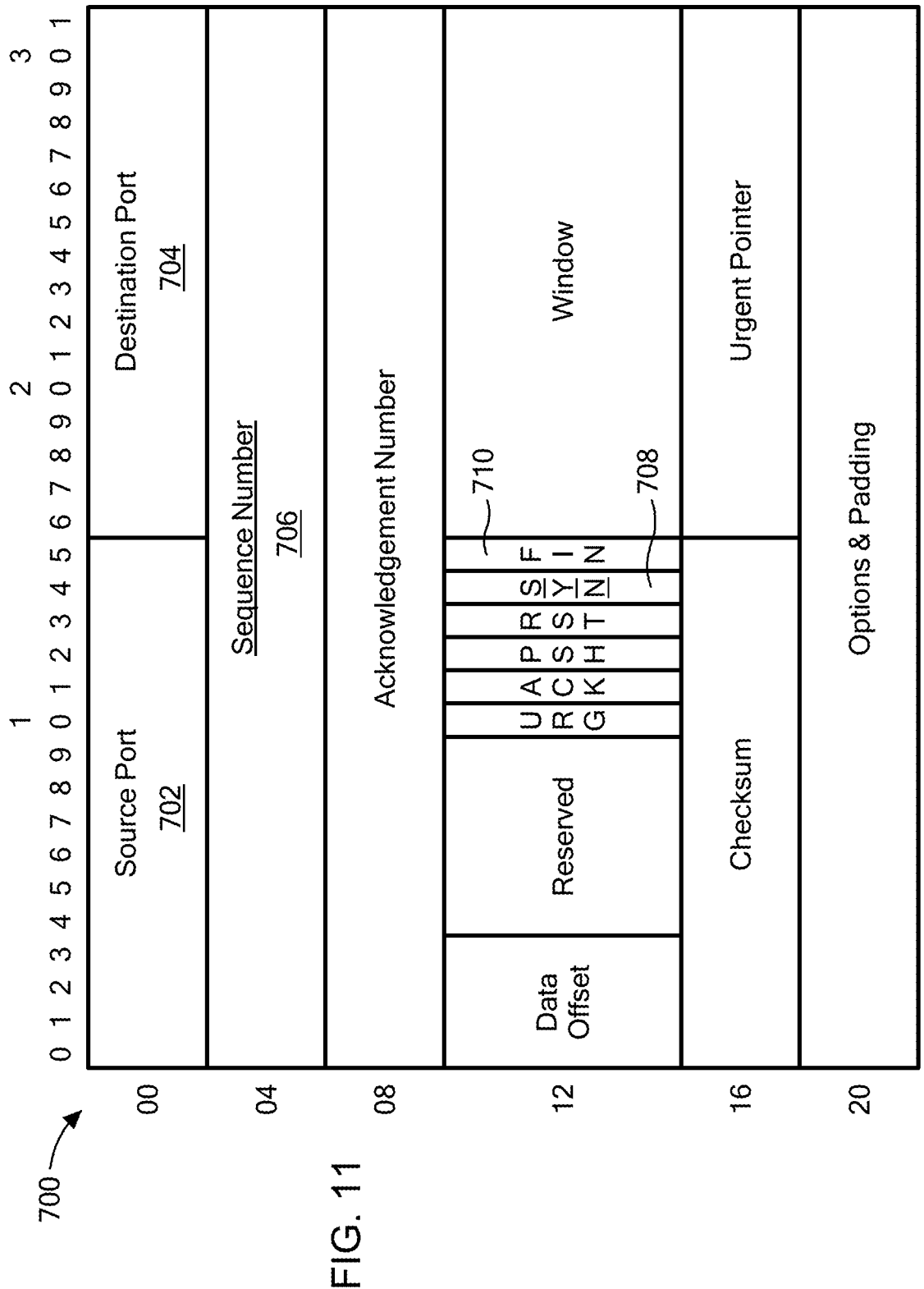
FIG. 11 schematically shows a layout of a TCP header, identifying fields used for identifying a beginning of a session, according to an embodiment of the present invention.

FIG. 9 is a schematic layout of an Ethernet header 500, including a Destination MAC Address 502 and an 802.1q VLAN Tag 504. FIG. 10 is a schematic layout of an IP header 600, including a Protocol field 602, a Source IP Address 604 and a Destination IP Address 606. FIG. 11 is a schematic layout of a TCP header 700, including a Source Port 702, a Destination Port 704, a Sequence Number 706, a SYN flag 708 and a FIN flag 710. These packets and the identified fields may be used to identify the beginning of a session, as summarized in Table 3.

TABLE 3

| Data Item | Where From | Description |
|---|---|---|
| Physical Interface | Ethernet Header | This is the actual port that the message was received on, which can be associated or discerned by the Destination MAC Address |
| Tenant | Ethernet Header OR Source MAD Address & Previous Advertisement | Logical association with a group of computers. |
| Protocol | IP Header | This defines the protocol in use and, for the TCP case, it must be set to a value that corresponds to TCP |
| Source IP Address | IP Header | Defines the source IP Address of the initial packet of a flow. |
| Destination IP Address | IP Header | Defines the destination IP Address of the initial packet of a flow. |
| Source Port | TCP Header | Defines the flow instance from the source. This may reflect a client, a firewall in front of the client, or a carrier grade NAT. |
| Destination Port | TCP Header | This defines the desired service requested, such as 80 for HTTP. |
| Sequence Number | TCP Header | This is a random number assigned by the client. It may be updated by a firewall or carrier grade NAT. |
| SYN Bit On | TCP Header | When the SYN bit is on, and no others, this is an initial packet of a session. It may be retransmitted if there is no response to the first SYN message. |

Augmented IP Router (AIPR)

Figure 12:
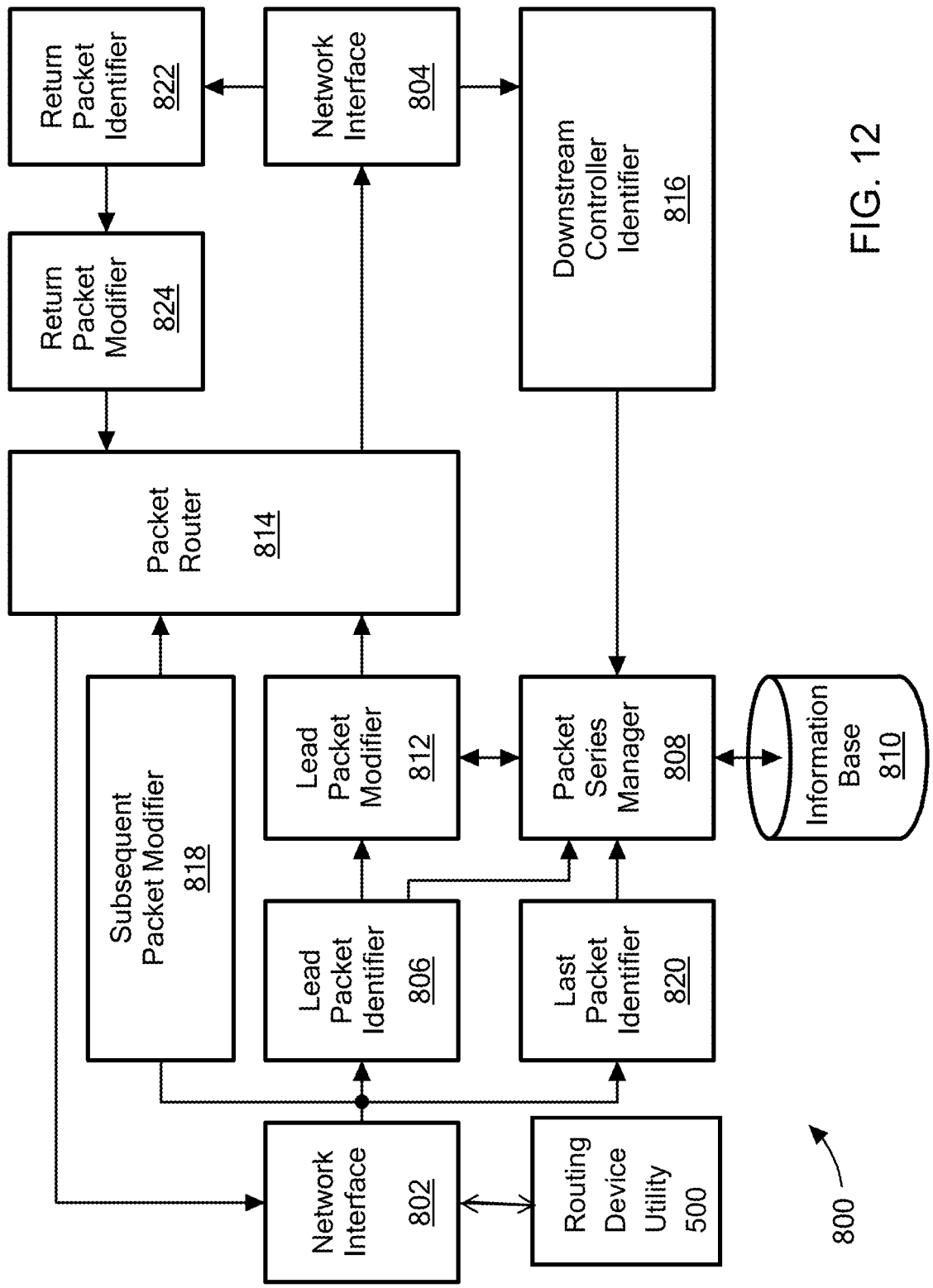
FIG. 12 schematically shows a block diagram of an AIPR of FIG. 8, according to an embodiment of the present invention.

FIG. 12 is a schematic block diagram of an AIPR (waypoint) 800 configured in accordance with illustrative embodiments of the invention. In preferred embodiments, the AIPR 800 includes the configuration interface 316 of FIGS. 4 and 5. The AIPR 800 includes at least two network interfaces 802 and 804, through which the AIPR 800 may be coupled to two networks. The interfaces 802 and 804 may be, for example, Ethernet interfaces. The AIPR 800 may send and receive packets via the interfaces 802 and 804.

A lead packet identifier 806 automatically identifies lead packets, as discussed herein. In general, the lead packet identifier 806 identifies a lead packet when the lead packet identifier 806 receives a packet related to a session that is not already represented in the AIPR's information base 810, such as a packet that identifies a new source client/destination service network address/port number pair. As noted, each lead packet is an initial, non-dropped, packet of a series of packets (session). Each session includes a lead packet and at least one subsequent packet. The lead packet and all the subsequent packets are sent by the same source client toward the same destination service, for forward flow control. For forward and backward flow control, all the packets of the session are sent by either the source client or the destination service toward the other.

A session (packet series) manager 808 is coupled to the lead packet identifier 806. For each session, the session manager assigns a unique identifier. The unique identifier may be, for example, a combination of the network address of the AIPR 800 or of the interface 802, in combination with a first port number assigned by the session manager 808 for receiving subsequent packets of this session. The unique identifier may further include the network address of the AIPR 800 or of the other interface 804, in combination with a second port number assigned by the session manager 808 for transmitting the lead packet and subsequent packets. This unique identifier is associated with the session. The session manager 808 stores information about the session in an information base 810. This information may include the unique identifier, in association with the original source client/destination service network address/port number pairs.

Figure 13:
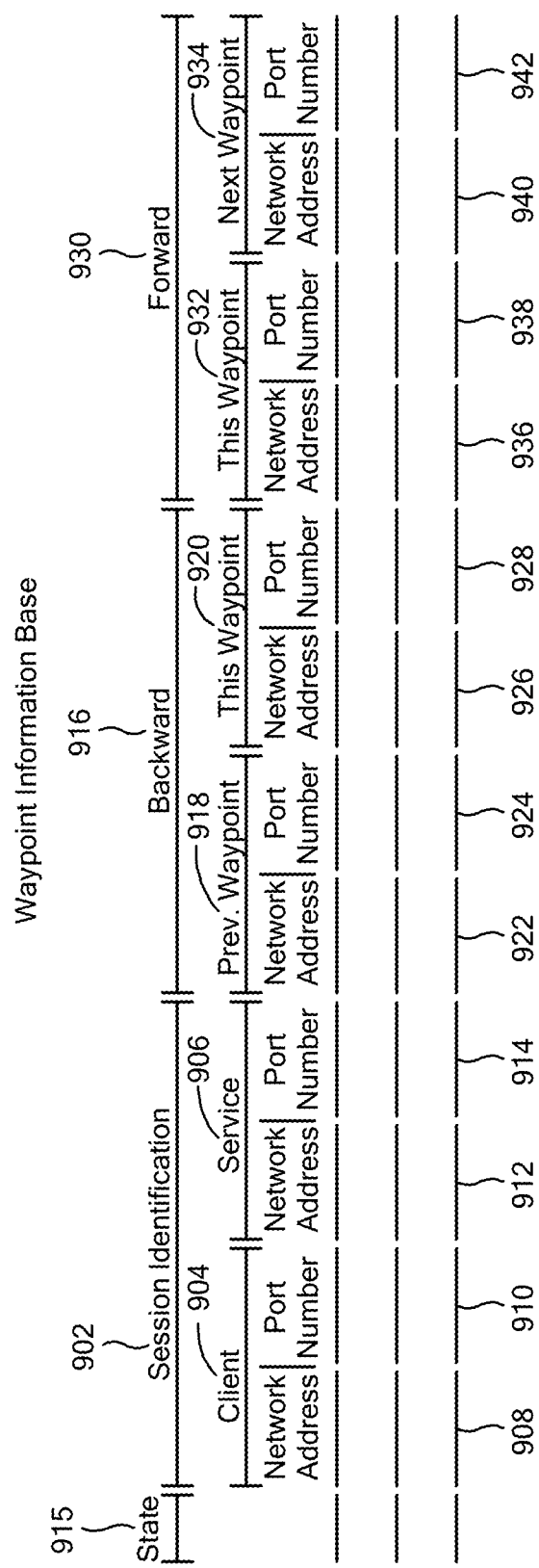
FIG. 13 shows a schematic illustration of information stored in an information base by the AIPR of FIGS. 8 and 12, according to an embodiment of the present invention.

FIG. 13 is a schematic layout of an exemplary waypoint information base 900. Each row represents a session. A session identification column 902 includes sub-columns for the source client 904 and the destination service 906. For each client 904, its network address 908 and port number 910 are stored. For each destination service 906, its network address 912 and port number 914 are stored. This information is extracted from the lead packet.

State information about the session may be stored in a state column 915. This information may be used to statefully follow a series of packets, such as when a session is being initiated or ended.

A backward column includes sub-columns for storing information 916 about a portion of the backward path, specifically to the previous AIPR. The backward path information 916 includes information 918 about the previous AIPR and information 920 about the present AIPR 800. The information 918 about the previous AIPR includes the AIPR's network address 922 and port number 924. The session manager 808 extracts this information from the lead packet, assuming the lead packet was forwarded by an AIPR. If, however, the present AIPR 800 is the first AIPR to process the lead packet, the information 918 is left blank as a flag. The information 920 about the present AIPR 800 includes the network address 926 of the interface 802 over which the lead packet was received, as well as the first port number 928 assigned by session manager 808.

The waypoint information base 900 is also configured to store information 930 about a portion of the forward path, specifically to the next AIPR. This information 930 includes information 932 about the present AIPR 800 and information 934 about the next AIPR along the path, assuming there is a next AIPR. The information 932 includes the network address 936 of the interface over which the present AIPR will send the lead packet and subsequent packets, as well as the second port number 938 assigned by the session manager 808. The information 934 about the next AIPR along the path may not yet be available, unless the AIPR is provisioned with information about the forward path. The information 934 about the next AIPR includes its network address 940 and port number 942. If the information 934 about the next AIPR is not yet available, the information 934 may be filled in when the AIPR 800 processes a return packet, as described below.

Some embodiments of the waypoint information base 900 may include the forward information 930 without the backward information 916. Other embodiments of the waypoint information base 900 may include the backward information 916 without the forward information 930. Statistical information may be gathered and/or calculated using either or both forward and backward information 916.

Returning to FIG. 12, a lead packet modifier 812 is coupled to the session manager 808. The lead packet modifier 812 modifies the lead packet to store the unique identifier associated with the session. The original source client network address/port number pair, and the original destination service network address/port number pair, are stored in the modified lead packet, if necessary. The lead packet may be enlarged to accommodate the additional information stored therein, or existing space within the lead packet, such a vendor specific attribute field, may be used. Other techniques for transmitting additional information are protocol specific, for example with TCP, the additional information could be transmitted as a TCP Option field, or added to the SYN packet as data. In either case, the term session data block is used to refer to the information added to the modified lead packet.

Figure 14:
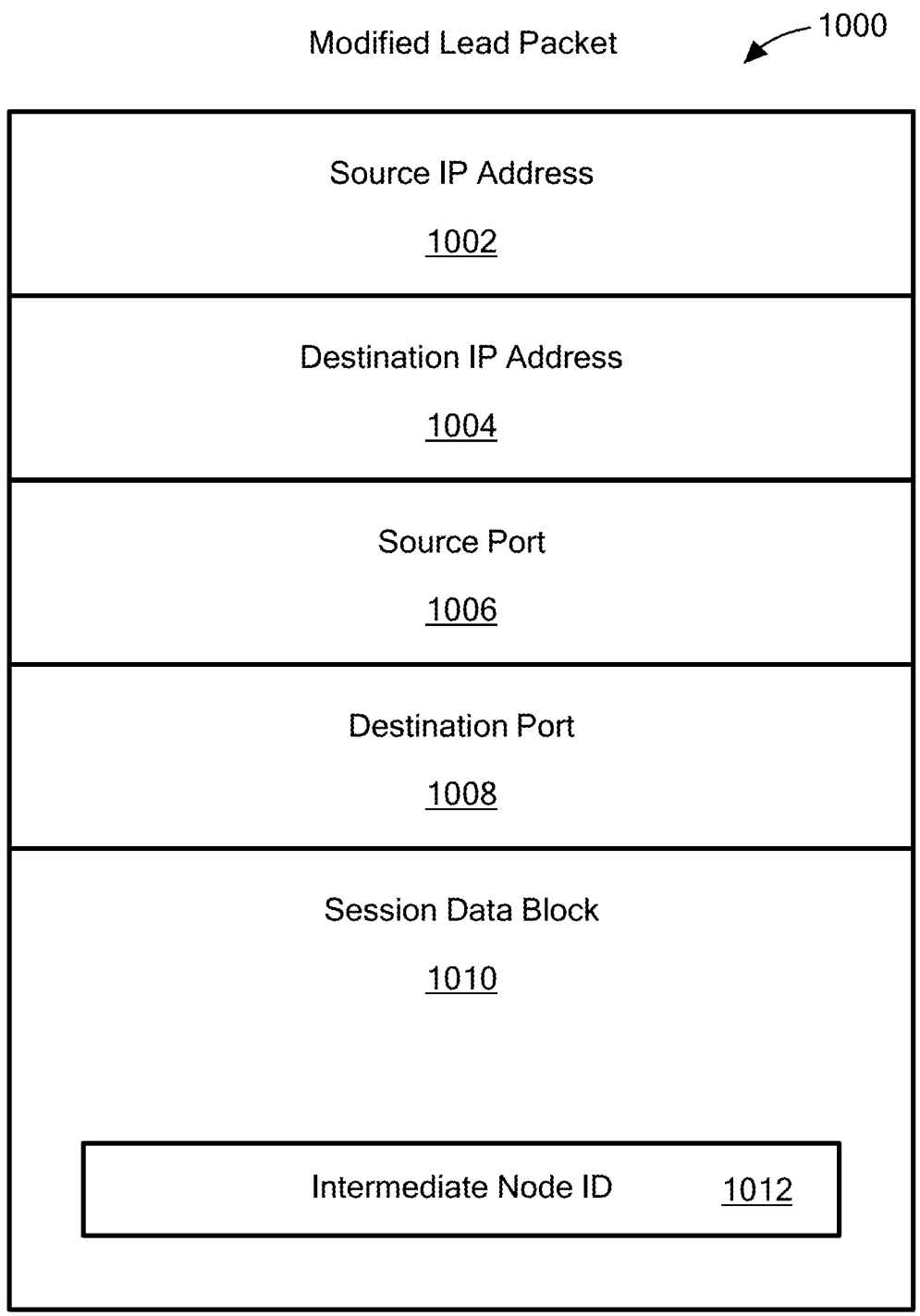
FIG. 14 schematically shows a modified lead packet produced by the AIPR of FIG. 9, according to an embodiment of the present invention.

FIG. 14 is a schematic diagram of an exemplary modified lead packet 1000 showing the original source and destination IP addresses 1002 and 1004, respectively, and the original source and destination port numbers 1006 and 1008, respectively. FIG. 14 also shows a session data block 1010 in the modified lead packet 1000. Although the session data block 1010 is shown as being contiguous, it may instead have its contents distributed throughout the modified lead packet 1000. The session data block 1010 may store an identification of the sending AIPR, i.e., an intermediate node identifier 1012, such as the network address of the second network interface 804 and the second port number.

Returning to FIG. 12, the lead packet modifier 812 updates the packet length, if necessary, to reflect any enlargement of the packet. The lead packet modifier 812 updates the checksum of the packet to reflect the modifications made to the packet. The modified lead packet is then transmitted by a packet router 814, via the second network interface 804. The modified lead packet is naturally routed, unless the AIPR 800 has been provisioned with forward path information.

Eventually, the destination service sends a return packet. The AIPR 800 receives the return packet via the second interface 804. If another AIPR (downstream AIPR) between the present AIPR 800 and the destination service handles the lead packet and the return packet, the downstream AIPR modifies the return packet to include the downstream AIPR's network address and a port number. A downstream controller 816 identifier uses stateful inspection, as described herein, to identify the return packet. The downstream controller 816 stores information 934 (FIG. 13), specifically the network address and port number, about the next AIPR in the waypoint information base 900.

The present AIPR 800 may use this information to address subsequent packets to the next AIPR. Specifically, a subsequent packet modifier 818 may set the destination address of the subsequent packets to the network address and port number 940 and 942 (FIG. 13) of the next waypoint, instead of directly to the destination service. The packet router 814 sends the subsequent packets, according to their modified destination addresses. Thus, for each series of packets, subsequent packets flow through the same downstream packet flow controllers as the lead packet of the series of packets.

A last packet identifier 820 statefully follows each session to identify an end of each stream, as discussed above. As noted, in some cases, the end is signified by a final packet, such as a TCP packet with the RST flag set or a TCP ACK packet in return to a TCP packet with the FIN flag set. In other cases, the end may be signified by a timer expiring. When the end of a session is detected, the packet series manager 808 disassociates the unique identifier from the session and deletes information about the session from the waypoint information base 900.

Where the AIPR 800 is provisioned to be a last AIPR before a destination service, the lead packet modifier 806 restores the lead packet to the state the lead packet was in when the source client sent the lead packet, or as the lead packet was modified, such as a result of network address translation (NAT). Similarly, the subsequent packet modifier 818 restores subsequent packets.

Similarly, if the destination address of the lead packet is the same as the network address of the AIPR 800, or its network interface 802 over which it receives the lead packets, the lead packet modifier 806 and the subsequent packet modifier 818 restore the packet and subsequent packets.

As noted, in some protocols, several packets are required to initiate a session, as with the SYN-SYN/ACK-ACK handshake of the TCP. Thus, the downstream controller identifier 816 may wait until a second return packet is received from the destination service before considering a session as having started.

As noted, some embodiments of the waypoint 800 also manage return packet paths. The lead packet identifier 806 automatically ascertains whether a lead packet was forwarded to the waypoint 800 by an upstream waypoint. If the lead packet includes a session data block, an upstream waypoint forwarded the lead packet. The packet series manager 808 stores information about the upstream waypoint in the waypoint information base 810. A return packet identifier 822 receives return packets from the second network interface 804 and automatically identifies return packets of the session. These return packets may be identified by destination address and port number being equal to the information 932 (FIG. 13) in the waypoint information base corresponding to the session. A return packet modifier modifies the return packets to address them to the upstream waypoint for the session, as identified by the information 918 in the waypoint information base 900.

Figure 15:
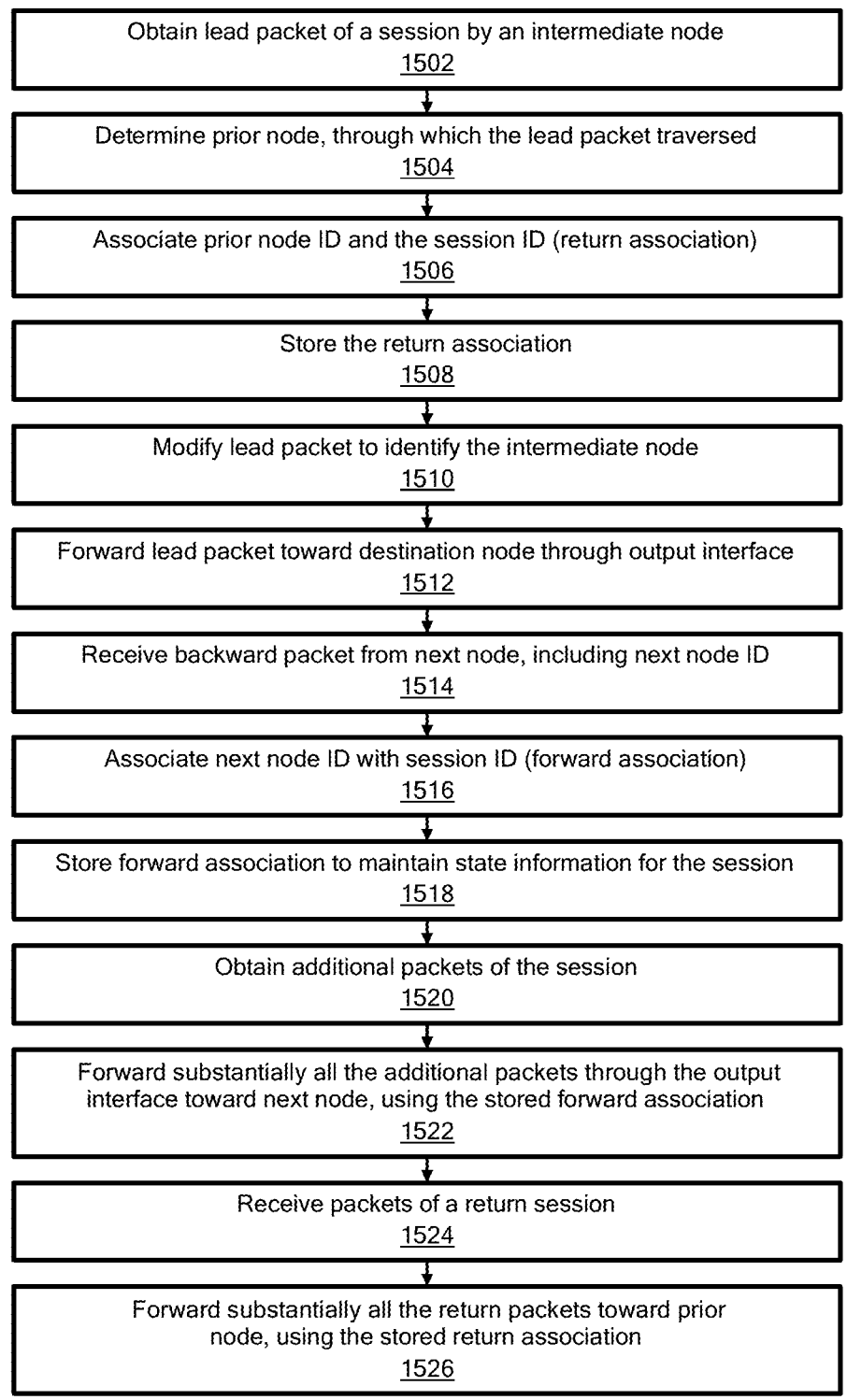
FIGS. 15 and 16 show flowcharts illustrating operations performed by the AIPR of FIGS. 8 and 12, according to an embodiment of the present invention.

FIG. 15 shows a flowchart schematically illustrating some operations performed by the AIPR 800 (FIG. 12) in accordance with illustrative embodiments of the invention. The flowchart illustrates a packet routing method for directing packets of a session from an originating node toward a destination node in an IP network. At step 1502, an intermediate node obtains a lead packet of a plurality of packets in a session. The intermediate node may include a routing device or a switching device that performs a routing function.

The packets in the session have a unique session identifier. At step 1504, a prior node, through which the lead packet traversed, is determined. The prior node has a prior node identifier. At step 1506, a return association is formed between the prior node identifier and the session identifier. At step 1508, the return association is stored in memory to maintain state information for the session.

At step 1510, the lead packet is modified to identify at least the intermediate node. At step 1512, the lead packet is forwarded toward the destination node though an intermediate node electronic output interface to the IP network. The electronic output interface is in communication with the IP network. At step 1514, a backward message (e.g., a packet, referred to as a "backward packet") is received through an electronic input interface of the intermediate node. The backward message is received from a next node. The next node has a next node identifier. The backward message includes the next node identifier and the session identifier. The electronic input interface is in communication with the IP network.

At step 1516, a forward association is formed between the next node identifier and the session identifier. At step 1518, the forward association is stored in memory, to maintain state information for the session. At step 1520, additional packets of the session are obtained. At step 1522, substantially all of the additional packets in the session are forwarded toward the next node, using the stored forward association. The additional packets are forwarded through the electronic output interface of the intermediate node.

At step 1524, a plurality of packets is received in a return session, or a return portion of the session, from the destination. The return session is addressed toward the originating node. At step 1526, substantially all the packets in the return session are forwarded toward the prior node, using the stored return association. The packets are forwarded through the electronic output interface.

Figure 16:
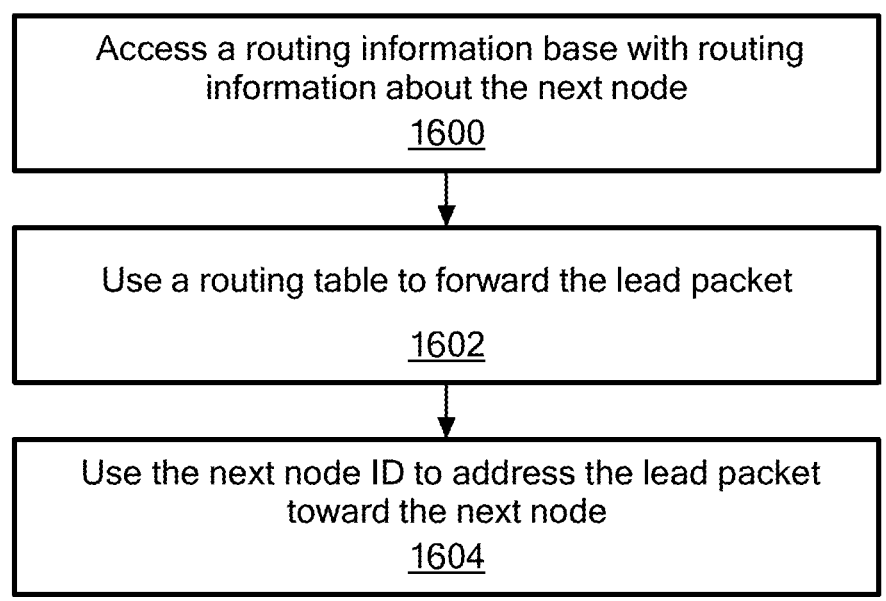

As shown at step 1600 in FIG. 16, forwarding the lead packet 1412 toward the destination node may include accessing a routing information base having routing information for the next node. As shown at step 1602, the intermediate node may have a routing table, and forwarding the lead packet 1412 toward the destination node may include using the routing table to forward the lead packet toward the destination node. As shown at step 1604, forwarding the lead packet 1412 toward the destination node may include using the next node identifier to address the lead packet toward the next node.

The lead packet may be addressed so that a plurality of network devices receive the lead packet after it is forwarded and before the next node receives the lead packet.

An AIPR 800 and all or a portion of its components 802-824 may be implemented by a processor executing instructions stored in a memory, hardware (such as combinatorial logic, Application Specific Integrated Circuits (ASICs), Field-Programmable Gate Arrays (FPGAs) or other hardware), firmware or combinations thereof. In a similar manner, the routing device utility 510 also may be implemented by a processor executing instructions stored in a memory, hardware (such as combinatorial logic, Application Specific Integrated Circuits (ASICs), Field-Programmable Gate Arrays (FPGAs) or other hardware), firmware or combinations thereof.

Various embodiments of the invention may be implemented at least in part in any conventional computer programming language. For example, some embodiments may be implemented in a procedural programming language (e.g., "C"), or in an object oriented programming language (e.g., "C++"). Other embodiments of the invention may be implemented as a pre-configured, stand-along hardware element and/or as preprogrammed hardware elements (e.g., application specific integrated circuits, FPGAs, and digital signal processors), or other related components.

In an alternative embodiment, the disclosed apparatus and methods (e.g., see the various flow charts described above) may be implemented as a computer program product for use with a computer system. Such implementation may include a series of computer instructions fixed either on a tangible, non-transitory medium, such as a computer readable medium (e.g., a diskette, CD-ROM, ROM, or fixed disk). The series of computer instructions can embody all or part of the functionality previously described herein with respect to the system.

Those skilled in the art should appreciate that such computer instructions can be written in a number of programming languages for use with many computer architectures or operating systems. Furthermore, such instructions may be stored in any memory device, such as semiconductor, magnetic, optical or other memory devices, and may be transmitted using any communications technology, such as optical, infrared, microwave, or other transmission technologies.

Among other ways, such a computer program product may be distributed as a removable medium with accompanying printed or electronic documentation (e.g., shrink wrapped software), preloaded with a computer system (e.g., on system ROM or fixed disk), or distributed from a server or electronic bulletin board over the network (e.g., the Internet or World Wide Web). In fact, some embodiments may be implemented in a software-as-a-service model ("SAAS") or cloud computing model. Of course, some embodiments of the invention may be implemented as a combination of both software (e.g., a computer program product) and hardware. Still other embodiments of the invention are implemented as entirely hardware, or entirely software.

Although the above discussion discloses various exemplary embodiments of the invention, it should be apparent that those skilled in the art can make various modifications that will achieve some of the advantages of the invention without departing from the true scope of the invention.

Although the above discussion discloses various exemplary embodiments of the invention, it should be apparent that those skilled in the art can make various modifications that will achieve some of the advantages of the invention without departing from the true scope of the invention.

What is claimed is:

1. A method of routing a plurality of packets across a network toward a destination, the plurality of packets being a part of a session, the method comprising:

modifying each of the plurality of packets to include a sequence number that is different from the sequence number of other packets in the plurality of packets, the plurality of packets being transformed into a corresponding plurality of processed packets;

duplicating the plurality of processed packets to produce a corresponding plurality of duplicated packets;

forwarding a first lead packet of the plurality of processed packets toward the destination using a first stateful path through the network, the first lead packet establishing the first stateful path comprising one or more first waypoints traversed by the first lead packet;

forwarding a second lead packet of the plurality of duplicated packets toward the destination using a second stateful path through the network, the second lead packet establishing the second stateful path comprising one or more second waypoints traversed by the lead packet;

forwarding the plurality of processed packets toward the destination using the first stateful path through the network, the plurality of processed packets traversing the same one or more first waypoints as the first lead packet and in a same order as the first lead packet; and forwarding the plurality of duplicated packets toward the destination using the second stateful path through the network, the plurality of duplicated packets traversing the same one or more second waypoints as the second lead packet and in a same order as the second lead packet, the first stateful path being different from the second stateful path such that an initial waypoint of the one or more first waypoints being different from an initial waypoint of the one or more second waypoints.

2. The method as defined by claim 1 wherein modifying each packet includes adding the sequence number as metadata at the end of each of the plurality of packets.

3. The method as defined by claim 1 further including:
receiving both the plurality of processed packets and the duplicated packets;
eliminating redundant packets from the processed packets and the duplicated packets to produce a plurality of remaining packets; and
forwarding the plurality of remaining packets toward the destination.

4. The method as defined by claim 1 wherein each packet includes an initial checksum, further wherein modifying comprises modifying the initial checksum of each packet to form a new checksum, the plurality of processed packets each having a new checksum.

5. The method as defined by claim 4 further including:
receiving both the plurality of processed packets and the duplicated packets;
eliminating redundant packets from the processed packets and the duplicated packets to produce a plurality of remaining packets;
removing the sequence numbers from the plurality of remaining packets;
producing different checksum values after removing the sequence numbers from the plurality of remaining packets; and
replacing the new checksum with the different checksum values in each of the remaining packets so that each of the remaining packets has at least one different checksum value.

6. The method as defined by claim 5 wherein the new checksum for each packet is the same as the initial checksum for that packet.

7. The method as defined by claim 1 wherein forwarding the plurality of processed packets comprises:
forwarding the plurality of processed packets using a first router interface of a router; and
forwarding the plurality of duplicated packets using a second router interface of the router.

8. The method as defined by claim 1 wherein the first and second stateful paths are prescribed prior to forwarding, the first and second stateful paths being bi-directional paths.

9. The method as defined by claim 1 wherein the first and second stateful paths are prescribed prior to forwarding, the first and second stateful paths being one-directional paths.

10. The method as defined by claim 1 wherein the first and second stateful paths are prescribed prior to forwarding to include at least one augmented IP router (AIPR).

11. The method as defined by claim 1 wherein the session includes the plurality of packets and a second plurality of packets, the method not modifying the second plurality of packets.

12. The method as defined by claim 1 further comprising an augmented IP router (AIPR) receiving one of the plurality of processed packets or the plurality of duplicated packets, the AIPR forwarding the received packets without modifying each packet to include or remove a sequence number.

13. The method as defined by claim 1 further comprising storing the plurality of processed packets in memory after modifying, duplicating further comprising retrieving the plurality of processed packets from memory and duplicating the retrieved processed packets to produce the corresponding plurality of duplicated packets.

14. The method as defined by claim 1 wherein the network comprises an IP network.

15. A routing device for routing a plurality of packets across an IP network toward a destination, the plurality of packets being a part of a session, the routing device comprising:
a packet modifier configured to modify the plurality of packets to include a sequence number that is different from the sequence number of other packets in the plurality of packets, the plurality of packets being transformed into a corresponding plurality of processed packets;
memory storing the plurality of processed packets;
a packet duplicator operatively coupled with the memory, the packet duplicator being configured to retrieve the plurality of processed packets from memory and duplicate the plurality of processed packets to produce a corresponding plurality of duplicated packets; and
an output operatively coupled with the packet duplicator, the output being configured to forward a first lead packet of the plurality of processed packets toward the destination using a first stateful path through the network, the first lead packet establishing the first stateful path comprising one or more first waypoints traversed by the first lead packet;
the output being configured to forward a second lead packet of the plurality of duplicated packets toward the destination using a second stateful path through the network, the second lead packet establishing the second stateful path comprising one or more second waypoints traversed by the second lead packet;
the output being configured to forward the plurality of processed packets toward the destination using first stateful path through the network, the plurality of processed packets traversing the same one or more waypoints of the first stateful path as the lead packet and in a same order as the lead packet, the output being configured to forward the plurality of duplicated packets toward the destination using the second stateful path through the network, the plurality of duplicated packets traversing the same one or more second waypoints as the second lead packet and in a same order as the lead second packet, the first stateful path being different from the second stateful path such that an initial waypoint of the one or more first waypoints being different from an initial waypoint of the one or more second waypoints.

16. The routing device as defined by claim 15 wherein the packet modifier is configured to modify each packet to include the sequence number as metadata at the end of each of the plurality of packets.

17. The routing device as defined by claim 15 wherein the packet modifier is configured to modify each packet to include a new checksum.

18. The routing device as defined by claim 15 further comprising a controller configured to eliminate redundant packets from an incoming plurality of processed packets and duplicated packets to produce a plurality of remaining packets, the output being configured to forward the plurality of remaining packets toward the destination.

19. The routing device as defined by claim 15 wherein each packet includes an initial checksum, further wherein the packet modifier is configured to modify the initial checksum of each packet to form a new checksum, the packet modifier configured to modify the plurality of processed packets to have a new checksum.

20. The routing device as defined by claim 19 further including:
an interface configured to receive both an incoming plurality of processed packets and duplicated packets, and a controller configured to eliminate redundant packets from the incoming processed packets and the duplicated packets to produce a plurality of remaining packets,
the packet modifier configured to modify the sequence numbers from the plurality of remaining packets and produce different checksum values after removing the sequence numbers from the plurality of remaining packets,
the packet modifier further configured to replace the new checksum with the different checksum values in each of the remaining packets so that each of the remaining packets has at least one different checksum value.

21. The routing device as defined by claim 15 further comprising first and second router interfaces, further wherein the output is configured to forward the plurality of processed packets using the first router interface and the plurality of duplicated packets using the second router interface.

22. The routing device as defined by claim 15 wherein the first and second stateful paths are prescribed prior to forwarding, the first and second stateful paths being bi-directional paths.

23. A computer program product for use on a computer system for routing a plurality of packets across a network toward a destination, the plurality of packets being a part of a session, the computer program product comprising a tangible, non-transient computer usable medium having computer readable program code thereon, the computer readable program code comprising:
program code for modifying the plurality of packets to include a sequence number that is different from the sequence number of other packets in the plurality of packets, the plurality of packets being transformed into a corresponding plurality of processed packets;
program code for duplicating the plurality of processed packets to produce a corresponding plurality of duplicated packets;
program code for forwarding a first lead packet of the plurality of processed packets toward the destination using a first stateful path through the network, the first lead packet establishing the first stateful path comprising one or more first waypoints traversed by the lead packet;
program code for forwarding a second lead packet of the plurality of duplicated packets toward the destination using a second stateful path through the network, the second lead packet establishing the second stateful path comprising one or more second waypoints traversed by the second lead packet;
program code for forwarding the plurality of processed packets toward the destination using the first stateful path through the network, the plurality of processed packets traversing the same one or more first waypoints as the first lead packet and in a same order as the first lead packet; and
program code for forwarding the plurality of duplicated packets toward the destination using the second stateful path through the network, the plurality of processed packets traversing the same one or more second waypoints as the second lead packet and in a same order as the second lead packet,
the first stateful path being different from the second stateful path such that an initial waypoint of the one or more first waypoints being different from an initial waypoint of the one or more second waypoints.

24. The computer program product as defined by claim 23 wherein the program code for modifying each packet includes program code for adding the sequence number as metadata at the end of each of the plurality of packets.

25. The computer program product as defined by claim 23 further including:
program code for receiving both the plurality of processed packets and the duplicated packets;
program code for eliminating redundant packets from the processed packets and the duplicated packets to produce a plurality of remaining packets; and
program code for forwarding the plurality of remaining packets toward the destination.

26. The computer program product as defined by claim 23 wherein each packet includes an initial checksum, further wherein the program code for modifying comprises program code for modifying the initial checksum of each packet to form a new checksum, the plurality of processed packets each having a new checksum.

27. The computer program product as defined by claim 26 further including:
program code for receiving both the plurality of processed packets and the duplicated packets;
program code for eliminating redundant packets from the processed packets and the duplicated packets to produce a plurality of remaining packets;
program code for removing the sequence numbers from the plurality of remaining packets;
program code for producing different checksum values after removing the sequence numbers from the plurality of remaining packets; and
program code for replacing the new checksum with the different checksum values in each of the remaining packets so that each of the remaining packets has at least one different checksum value.

28. The computer program product as defined by claim 27 wherein the new checksum for each packet is the same as the initial checksum for that packet.

29. The computer program product as defined by claim 23 wherein the program code for forwarding the plurality of processed packets comprises:
   program code for forwarding the plurality of processed packets using a first router interface of a router; and
   program code for forwarding the plurality of duplicated packets using a second router interface of the router.

30. The computer program product as defined by claim 23 wherein the first and second stateful paths are prescribed prior to forwarding, the first and second stateful paths being bi-directional paths.

31. The computer program product as defined by claim 23 further comprising an augmented IP router (AIPR) receiving one of the plurality of processed packets or the plurality of duplicated packets, the AIPR including program code for forwarding the received packets without modifying each packet to include or remove a sequence number.

32. The computer program product as defined by claim 23 further comprising program code for storing the plurality of processed packets in memory after modifying, the program code for duplicating further comprising program code for retrieving the plurality of processed packets from memory and duplicating the retrieved processed packets to produce the corresponding plurality of duplicated packets.

\* \* \* \* \*